(12) United States Patent
Shabah et al.

(10) Patent No.: US 12,097,795 B2
(45) Date of Patent: Sep. 24, 2024

(54) DEVICE AND METHOD FOR SHARING A PAYLOAD BETWEEN TWO VEHICLES

(71) Applicant: HUMANITAS SOLUTIONS INC., Montréal (CA)

(72) Inventors: Abdo Shabah, Montréal (CA); Yuhanes Dedy Setiawan Liauw, Montréal (CA)

(73) Assignee: HUMANITAS SOLUTIONS INC., Québec (CA)

( * ) Notice: Subject to any disclaimer, the term of this patent is extended or adjusted under 35 U.S.C. 154(b) by 621 days.

(21) Appl. No.: 17/431,407

(22) PCT Filed: Feb. 14, 2020

(86) PCT No.: PCT/IB2020/051279
§ 371 (c)(1),
(2) Date: Aug. 16, 2021

(87) PCT Pub. No.: WO2020/165867
PCT Pub. Date: Aug. 20, 2020

(65) Prior Publication Data
US 2022/0134932 A1    May 5, 2022

Related U.S. Application Data

(60) Provisional application No. 62/806,241, filed on Feb. 15, 2019.

(51) Int. Cl.
*B60L 53/80* (2019.01)
*B60L 50/60* (2019.01)
(Continued)

(52) U.S. Cl.
CPC ............... *B60P 1/56* (2013.01); *B60L 50/64* (2019.02); *B60L 50/66* (2019.02); *B60L 53/80* (2019.02);
(Continued)

(58) Field of Classification Search
None
See application file for complete search history.

(56) References Cited

U.S. PATENT DOCUMENTS 6,014,597 A * 1/2000 Kochanneck ....... B60W 50/082
320/109
9,187,004 B1 * 11/2015 Davis ..................... B60L 53/30
(Continued)

OTHER PUBLICATIONS

International Search Report of PCT Application No. PCT/IB2020/051279, mailed Apr. 29, 2020.

*Primary Examiner* — Jonathan Snelting
(74) *Attorney, Agent, or Firm* — PEARL COHEN ZEDEK LATZER BARATZ LLP

(57) ABSTRACT

One or more embodiments of a device and a method are disclosed for sharing a payload. The device comprises an interior shell receiving therein a vehicle and comprising at least one payload receiving unit suitable for receiving a corresponding payload; an outside shell surrounding the interior shell and comprising at least one opening for transferring a payload between inside and outside of the outside shell; a securing member located for securing the outside shell with a mating member located on another device; a controllable biasing member connected to the interior shell and to the outside shell and operable between a biasing state and a free state wherein the interior shell is moveable with respect to the outside shell and wherein a transfer of is achieved by operating the biasing member in the free state, moving the interior shell with respect to the outside shell and transferring the payload.

14 Claims, 28 Drawing Sheets

(51) Int. Cl.
  *B60L 50/64* (2019.01)
  *B60P 1/56* (2006.01)
  *H01M 50/249* (2021.01)
  *H01M 50/264* (2021.01)

(52) U.S. Cl.
  CPC ....... *H01M 50/249* (2021.01); *H01M 50/264* (2021.01); *H01M 2220/20* (2013.01)

(56) References Cited

U.S. PATENT DOCUMENTS

| | | |
|---|---|---|
| 2013/0297116 A1 | 11/2013 | Reed et al. |
| 2014/0265690 A1 | 9/2014 | Henderson |
| 2017/0283090 A1* | 10/2017 | Miller .................... B64U 50/39 |
| 2017/0355259 A1 | 12/2017 | Borud et al. |
| 2019/0315235 A1* | 10/2019 | Kung .................... B64U 50/39 |

* cited by examiner

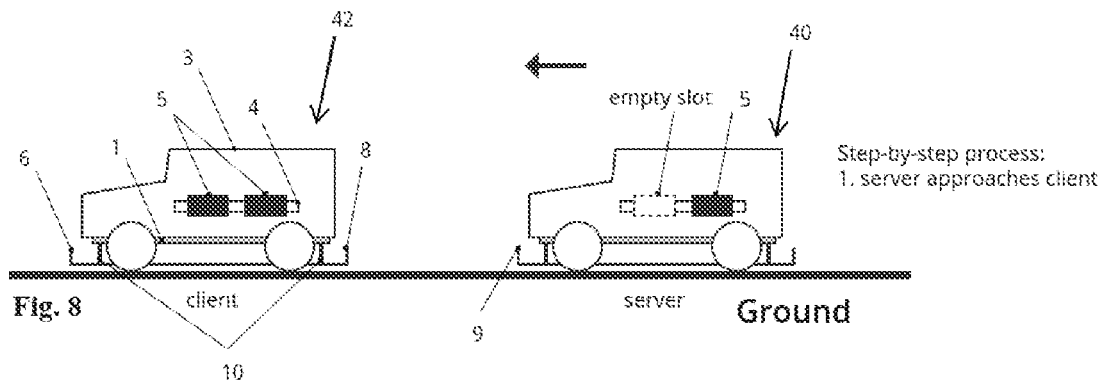

Fig. 8

Step-by-step process:
1. server approaches client

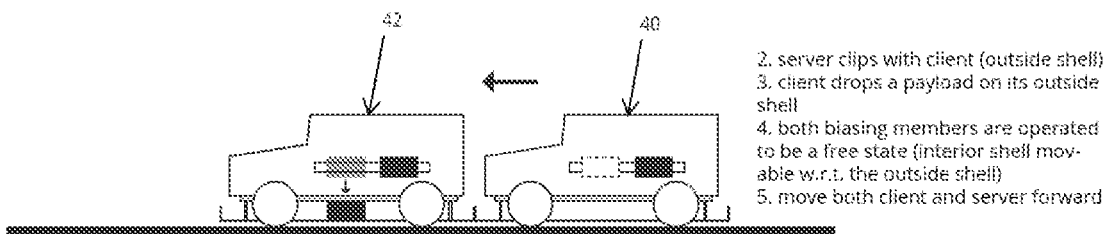

2. server clips with client (outside shell)
3. client drops a payload on its outside shell
4. both biasing members are operated to be a free state (interior shell movable w.r.t. the outside shell)
5. move both client and server forward

Fig. 9

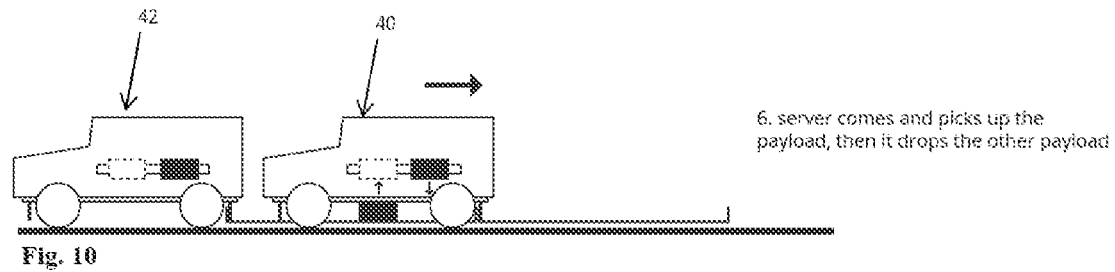

6. server comes and picks up the payload, then it drops the other payload

Fig. 10

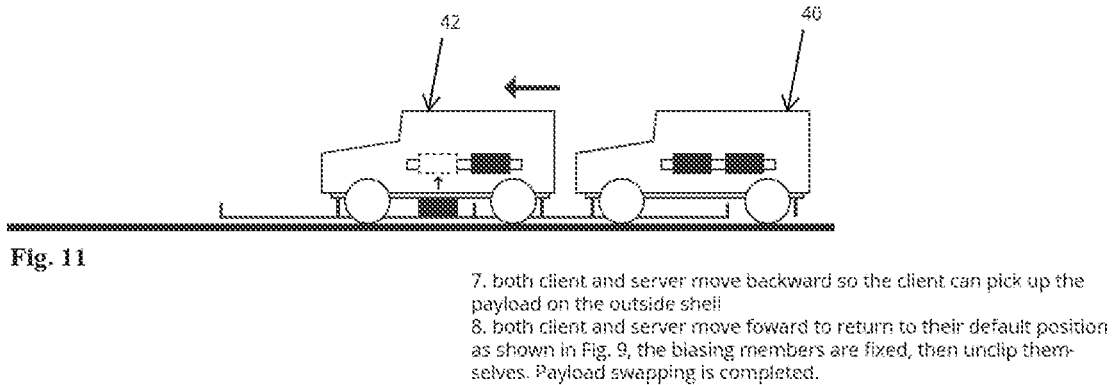

Fig. 11

7. both client and server move backward so the client can pick up the payload on the outside shell
8. both client and server move foward to return to their default position as shown in Fig. 9, the biasing members are fixed, then unclip themselves. Payload swapping is completed.

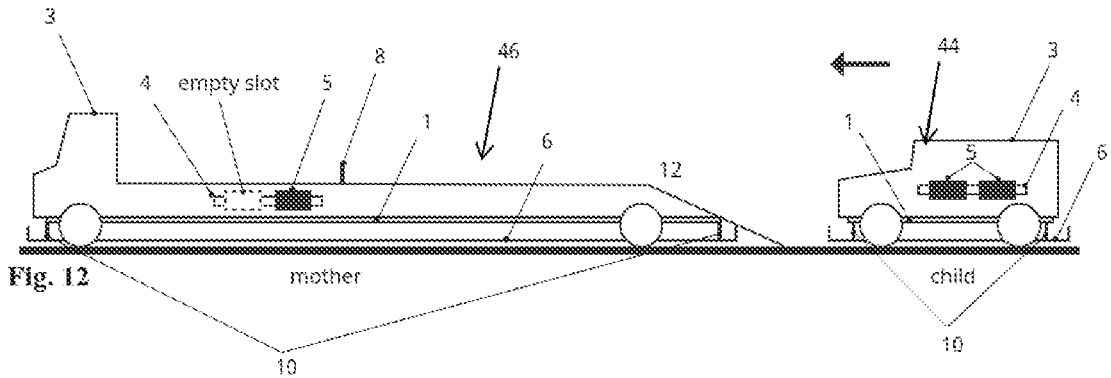

Fig. 12

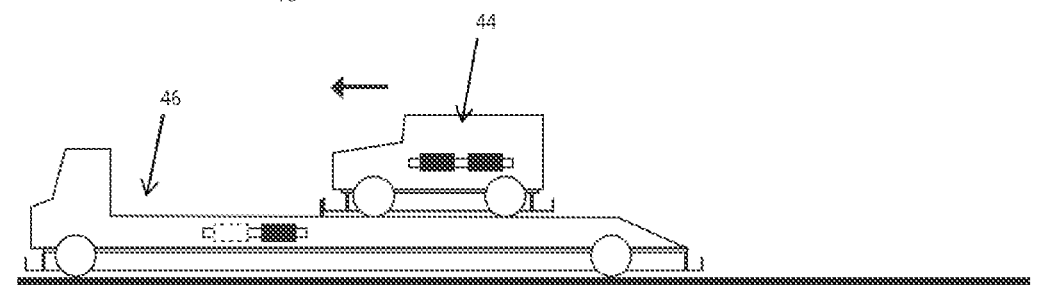

Fig. 13

2. child clips with mother (outside shell)
3. child's biasing member is operated to be a free state (interior shell movable w.r.t. the outside shell)
4. child moves forward to drop its payload

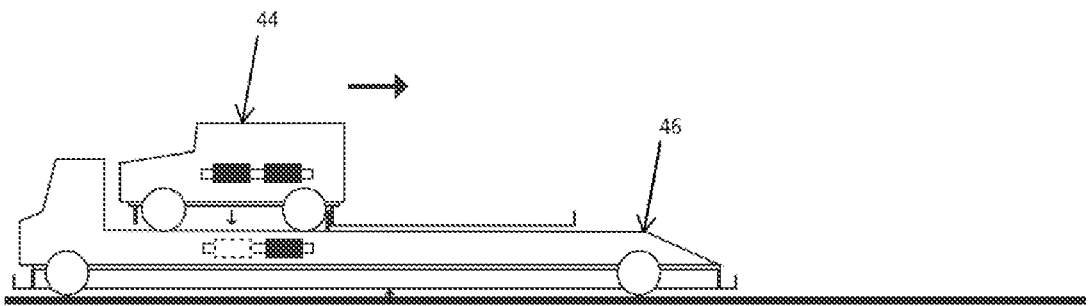

Fig. 14

5. child drops a payload
6. child moves backward to pick up a payload

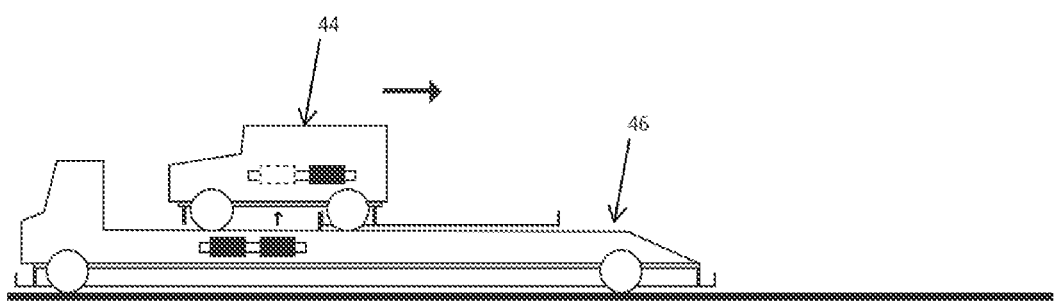

Fig. 15

7. child picks up a payload
8. child returns to its default position as shown in Fig. 13, fix its biasing member, then unclip and leave from mother. Payload-swapping finished.

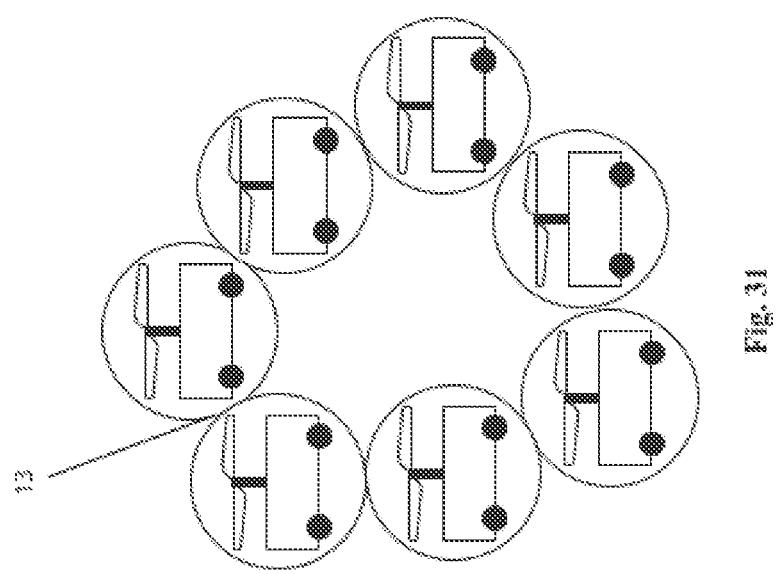
Fig. 31
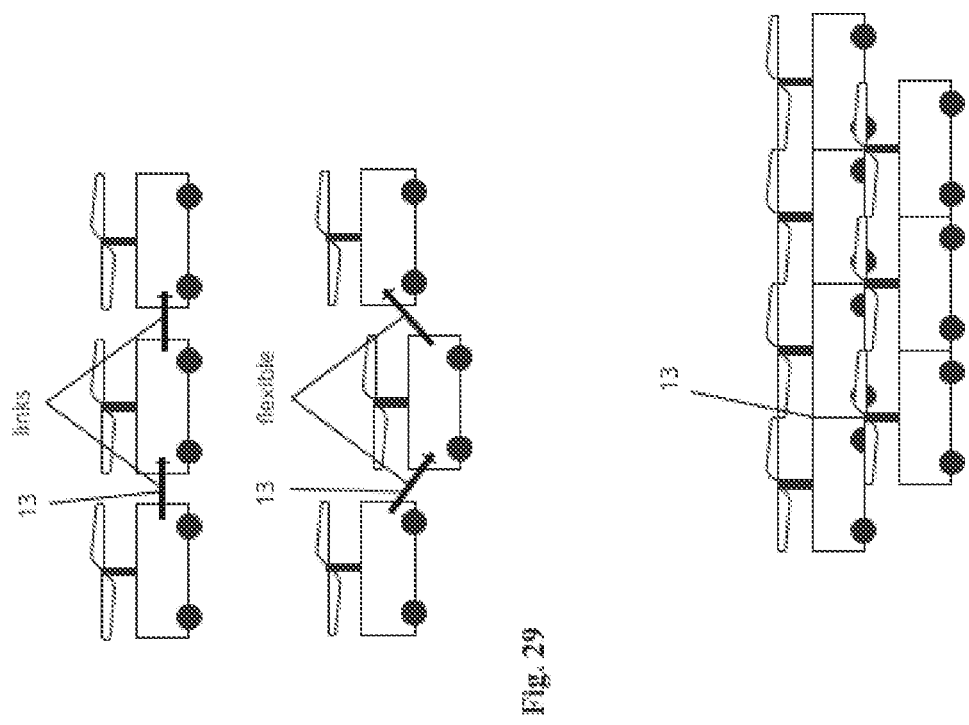
Fig. 29
Fig. 30

DEVICE AND METHOD FOR SHARING A PAYLOAD BETWEEN TWO VEHICLES

CROSS-REFERENCE TO RELATED APPLICATIONS

The present patent application is a National Phase Application of PCT International Application No. PCT/IB2020/051279, International Filing Date Feb. 14, 2020, which claims priority from U.S. Provisional Patent Application No. 62/806,241, filed on Feb. 15, 2019, which is hereby incorporated by reference by the present Applicant.

FIELD

One or more embodiments of the invention relate to operating a vehicle. More precisely, one or more embodiments of the invention pertain to a device and a method for sharing a payload between two vehicles.

BACKGROUND

Being able to share a payload between two vehicles, especially autonomous vehicles, is of great interest.

Features of the invention will be apparent from review of the disclosure, drawings and description of the invention below.

BRIEF SUMMARY

According to a broad aspect of the present technology, there is disclosed a device for enabling a vehicle to share a payload with another vehicle, the device comprising an interior shell receiving therein a vehicle, the interior shell further comprising at least one payload receiving unit, each payload receiving unit suitable for receiving a corresponding payload; an outside shell surrounding the interior shell, the outside shell comprising at least one opening sized and shaped for transferring a given payload between inside and outside of the outside shell; a securing member located on the outside shell and for securing the outside shell with a corresponding mating member located on another device with which a transfer of a payload has to be performed; a controllable biasing member connected to the interior shell and to the outside shell, the biasing member being operable between a biasing state wherein the outside shell is rigidly connected with the interior shell and a free state wherein the interior shell is moveable with respect to the outside shell along at least one given axis and wherein a transfer of the payload is achieved by at least securing the outside shell of the device using the securing member with another device, operating the biasing member in the free state, moving the interior shell with respect to the outside shell using the vehicle and transferring the payload accordingly.

According to one or more embodiments, the outside shell surrounds partially the interior shell.

According to one or more embodiments, the outside shell fully surrounds the interior shell.

According to one or more embodiments, the outside shell has a spherical shape.

According to one or more embodiments, the interior shell has a spherical shape.

According to one or more embodiments, the vehicle is selected from a group consisting of a flying vehicle, a ground vehicle and an underwater vehicle.

According to one or more embodiments, the flying vehicle is one of a drone, a flying car and a car drone.

According to one or more embodiments, the ground vehicle operates on one of sand and snow.

According to one or more embodiments, the ground vehicle comprises at least one moving mechanism, each of the at least one moving mechanism abutting an interior of the interior shell and causing the device to roll accordingly.

According to one or more embodiments, the at least one opening of the outside shell is sized and shaped for enabling another vehicle to enter inside the outside shell, further wherein the payload transfer is performed while the other vehicle is located inside the outside shell.

According to one or more embodiments, the outside shell comprises means for flexibly attaching the outside shell of another vehicle According to one or more embodiments, a payload transfer is achieved by performing at least one of a rotation, an acceleration and a deceleration following attachment of two vehicles.

According to a broad aspect of the present technology, there is disclosed a device for a vehicle, the device comprising an interior shell receiving therein a vehicle; an outside shell surrounding the interior shell; at least one securing member located on the outside shell, each of the at least one securing member for securing the outside shell with a corresponding mating member located on another vehicle; a controllable biasing member connected to the interior shell and to the outside shell, the biasing member being operable between a biasing state wherein the outside shell is rigidly connected with the interior shell and a free state wherein the interior shell is moveable with respect to the outside shell along at least one given axis; and wherein a connection may be performed between at least two vehicles using the at least one securing member by operating the biasing member in the free state and moving the interior shell with respect to the outside shell using the vehicle.

An advantage of one or more embodiments of the device disclosed herein is that it enables a vehicle to share a payload while the vehicle is in operation.

Another advantage of one or more embodiments of the device disclosed is that the device can be used with any type of vehicle thanks to the interior shell on which the vehicle is fixed to.

Another advantage of one or more embodiments of the device disclosed is that it may enable to achieve distributive propulsion by associating together a plurality of vehicles.

BRIEF DESCRIPTION OF THE DRAWINGS

In order that the one or more embodiments of invention may be readily understood, one or more embodiments of the invention are illustrated by way of example in the accompanying drawings.

FIG. 8 is a schematic which illustrates a first step of an embodiment of peer-to-peer payload swapping for a four-wheeled vehicle with another embodiment of the device.

FIG. 9 is a schematic which illustrates a second step of an embodiment of peer-to-peer payload swapping for a four-wheeled vehicle with another embodiment of the device.

FIG. 10 is a schematic which illustrates a third step of an embodiment of peer-to-peer payload swapping for a four-wheeled vehicle with another embodiment of the device.

FIG. 11 is a schematic which illustrates a fourth step of an embodiment of peer-to-peer payload swapping for a four-wheeled vehicle with another embodiment of the device.

FIG. 12 is a schematic which illustrates a first step of an embodiment of peer-to-peer payload swapping for a four-wheeled vehicle with another embodiment of the device in an embodiment wherein one of the four-wheeled vehicle is substantially larger than the other.

FIG. 13 is a schematic which illustrates a second step of an embodiment of peer-to-peer payload swapping for a four-wheeled vehicle with another embodiment of the device in an embodiment wherein one of the four-wheeled vehicle is substantially larger than the other vehicle.

FIG. 14 is a schematic which illustrates a third step of an embodiment of peer-to-peer payload swapping for a four-wheeled vehicle with another embodiment of the device in an embodiment wherein one of the four-wheeled vehicle is substantially larger than the other vehicle.

FIG. 15 is a schematic which illustrates a fourth step of an embodiment of peer-to-peer payload swapping for a four-wheeled vehicle with another embodiment of the device in an embodiment wherein one of the four-wheeled vehicle is substantially larger than the other vehicle.

FIG. 29 is a diagram which illustrates a sample connection of the flying cars.

FIG. 30 is a diagram which illustrates a train-like connection of the flying cars.

FIG. 31 is a diagram which illustrates a circle connection of the flying cars.

DETAILED DESCRIPTION

Figure 1:
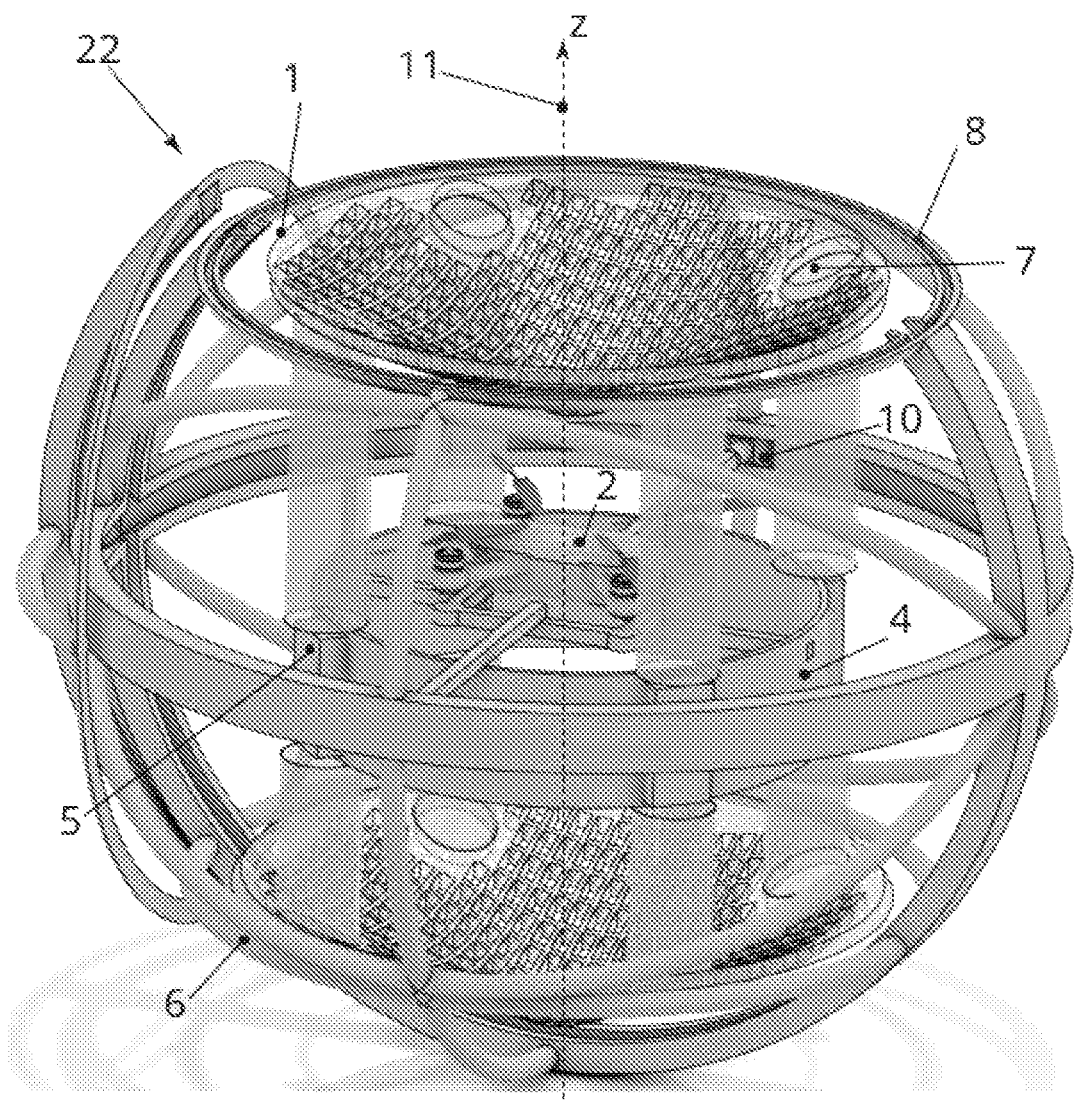
FIG. 1 is a perspective view of an embodiment of a device used for enabling a vehicle to share a payload with another vehicle in accordance with a first embodiment. In this embodiment, the vehicle is a quadcopter.

In the following description of the embodiments, references to the accompanying drawings are by way of illustration of an example by which one or more embodiments of the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, one or more embodiments of the present invention are directed to a device and a method for sharing a payload between two vehicles.

It will be appreciated that the payload may be of various types. In one embodiment, the payload comprises a battery suitable for providing electrical energy to a vehicle. In fact it will be appreciated that the payload is a load carried by the vehicle which may or may not be necessary for the operation of the vehicle.

It will be appreciated that the vehicle may be of various types as further explained below.

In fact, it will be appreciated that the vehicle may be selected from a group consisting of flying vehicles, ground vehicles and underwater vehicles.

In the case where the vehicle is a flying vehicle, the flying vehicle may be one of a drone, a flying car and a car drone.

The skilled addressee will appreciate that various embodiments may be possible for the drone, the flying car and the car drone. For instance and in the case where the flying vehicle is a drone, the flying vehicle may be a multirotor, such as for instance a quadcopter. The skilled addressee will appreciate that various alternative embodiments may be possible for the drone.

In the case where the vehicle is a ground vehicle, it will be appreciated that the ground vehicle may operate on any type of surface, such as for instance sand and snow.

In fact and in one embodiment, the ground vehicle comprises at least one moving mechanism, each of the at least one moving mechanism abutting an interior of an interior shell disclosed below and causing the device to roll accordingly.

It will be appreciated that the vehicle comprises an interior shell. The interior shell is sized and shaped to receive therein the vehicle.

Moreover, the interior shell further comprises at least one payload receiving unit, each payload receiving unit suitable for receiving a corresponding payload. In one embodiment, the interior shell comprises a payload receiving unit suitable for receiving a plurality of payloads.

It will be appreciated by the skilled addressee that the interior shell may have various shapes. For instance and in one embodiment, the interior shell has a spherical shape. In another embodiment, the interior shape has a substantially planar shape, such as one defining an elongated rectangle for instance.

It will be appreciated that the interior shape may or may not have a porous structure, i.e., one that does or does not allow air travel within. The skilled addressee will appreciate that a porous structure may be required in the case where the vehicle is a multirotor for instance.

It will be further appreciated that the interior shell may be made of various materials depending on the vehicle. For instance, the interior shell may be selected from a group consisting of plastic, aluminum, etc.

As mentioned above, it will be appreciated that the interior shell further comprises at least one payload receiving unit. The payload receiving unit is sized and shaped to receive at least one corresponding payload. The skilled addressee will appreciate that the payload receiving unit may have various shapes, such as one suitable for instance for receiving a payload having shape selected from a group consisting of a cube and a cylinder. In fact, the skilled addressee will appreciate that since numerous embodiments may be provided for the payload, numerous corresponding embodiments may be provided for the corresponding payload receiving unit suitable for receiving the corresponding payload.

It will be appreciated that the payload receiving unit comprises means for selectively releasing the payload. In fact it will be appreciated that the payload receiving unit may have various states. In a first state, the payload receiving unit stores or keeps secure the payload and the payload is therefore not free to move away from the payload receiving unit. In a second state, the payload receiving unit does not restrict a motion of a corresponding payload stored within. It will be appreciated that in such state, the payload receiving unit is also capable of receiving a corresponding payload from another device.

It will be appreciated that the device further comprises an outside shell.

The outside shell surrounds the interior shell. It will be appreciated that in one or more embodiments, the outside shell surrounds partially the interior shell, i.e., it surrounds only a portion of the interior shell. In one or more other embodiments, the outside shell fully surrounds the interior shell.

It will be appreciated by the skilled addressee that the outside shell may also have various shapes depending on an application sought. For instance and in one embodiment, the outside shell has a spherical shape. In another embodiment, the outside shape has a substantially planar shape, such as one defining an elongated rectangle for instance.

It will be appreciated that the outside shell may or may not have a porous structure, i.e., one that does or does not allow air to travel within. The skilled addressee will appreciate that a porous structure may be required if the vehicle is a multirotor for instance.

It will be further appreciated that the outside shell comprises at least one opening sized and shaped for transferring a given payload between inside and outside of the outside shell. It will be appreciated that the at least one opening may or may not be permanent.

In one or more embodiments, the outside shell further comprises an opening suitable for receiving another device of a smaller size, as further explained and illustrated below. In fact and in such embodiment, the other, smaller vehicle will enter into the outside shell and a payload will be shared accordingly.

It will be appreciated that the device further comprises a securing member. More precisely, the securing member is located on the outside shell and is used for securing the outside shell of the device with a corresponding mating member located on another device with which a transfer of a payload has to be performed.

It will be appreciated that the securing member may be of various types.

The device further comprises a controllable biasing member. The controllable biasing member is connected to the interior shell and to the outside shell. In fact, the controllable biasing member is operable between a biasing state and a free state. It will be appreciated that in the biasing state, the outside shell is rigidly connected with the interior shell. This means that the outside shell cannot move with respect to the interior shell. It will be appreciated that in the free state, the interior shell is moveable with respect to the outside shell along at least one given axis. In one or more other embodiments, the interior shell is moveable with respect to the outside shell along more than one given axis.

It will be appreciated that a transfer of the payload from one device to another device is performed, in one or more embodiments, by at least securing the outside shell of the device using the securing member with another device, operating the biasing member in the free state, moving the interior shell with respect to the outside shell using the vehicle and transferring the payload accordingly. It will be appreciated that in one embodiment the payload transfer may be achieved by performing at least one of a rotation, an acceleration and a deceleration following the attachment of the two vehicles.

In one or more embodiments of the device, the outside shell further comprises means for flexibly attaching to the outside shell of another vehicle.

It will be appreciated that various embodiments of the device may be provided as further explained below.

First Embodiment of a Device for Sharing a Payload Between Two Vehicles

In this first embodiment, the device 22 is used for enabling a vehicle to share a payload with another vehicle in the embodiment wherein the two vehicles are flying vehicles. More specifically the flying vehicles are quadcopters in this specific embodiment.

Now referring to FIG. 1, it will be appreciated that an interior shell 1 receives therein a vehicle 2. The vehicle 2 is fixedly mounted to the interior shell 1.

Figure 17:
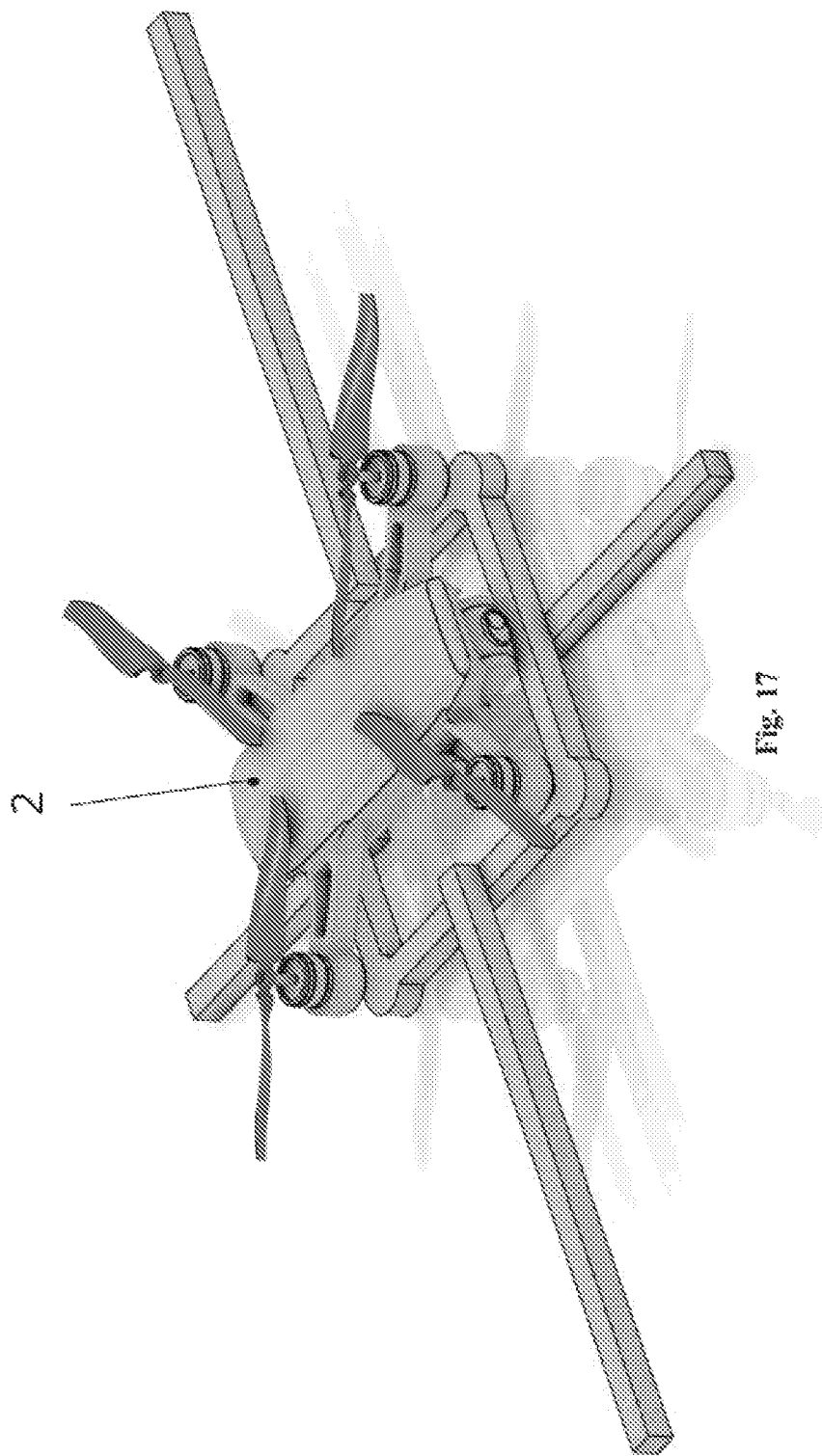
FIG. 17 is a perspective view illustrating how the vehicle disclosed in FIG. 1 is secured according to an embodiment.

Now referring to FIG. 17, there is shown how the vehicle 2 is mounted on a portion of the interior shell 1. It will be appreciated by the skilled addressee that the vehicle 2 may be mounted to the interior shell 1 according to various alternative embodiments known to the skilled addressee.

Now referring back to FIG. 1, the interior shell 1 comprises at least one payload receiving unit 4. In this specific embodiment, the payload receiving unit 4 is capable of receiving four payloads, an example of which is payload 5. It will be appreciated that in this embodiment, the four payloads are evenly spaced on the payload receiving unit 4. The skilled addressee will appreciate that various alternative embodiments may be possible.

It will be appreciated that the payload receiving unit 4 may selectively release at least one of the payloads. The payload may be retained on the payload receiving unit 4 and selectively released using various means, such as for instance mechanical means, magnetic means, etc.

An outside shell 6 surrounds the interior shell 1. The outside shell 6 comprises at least one opening 7 sized and shaped for transferring a given payload between inside and outside of the outside shell 6. It will be appreciated that in this specific embodiment the at least one opening 7 has a circular shape. The skilled addressee will appreciate that alternatively the at least one opening 7 may have another shape.

A securing member 8 is located on the outside shell 6 and is used for securing the outside shell 6 of the device 22 with a corresponding mating member located on another similar device, not shown, with which a transfer of a payload has to be performed.

A controllable biasing member 10 is connected to the interior shell 1 and to the outside shell 6 and is operable between a biasing state, wherein the outside shell 6 is rigidly connected with the interior shell 1 and a free state wherein the interior shell 1 is moveable with respect to the outside shell 6 along at least one given axis 11.

Figure 4:
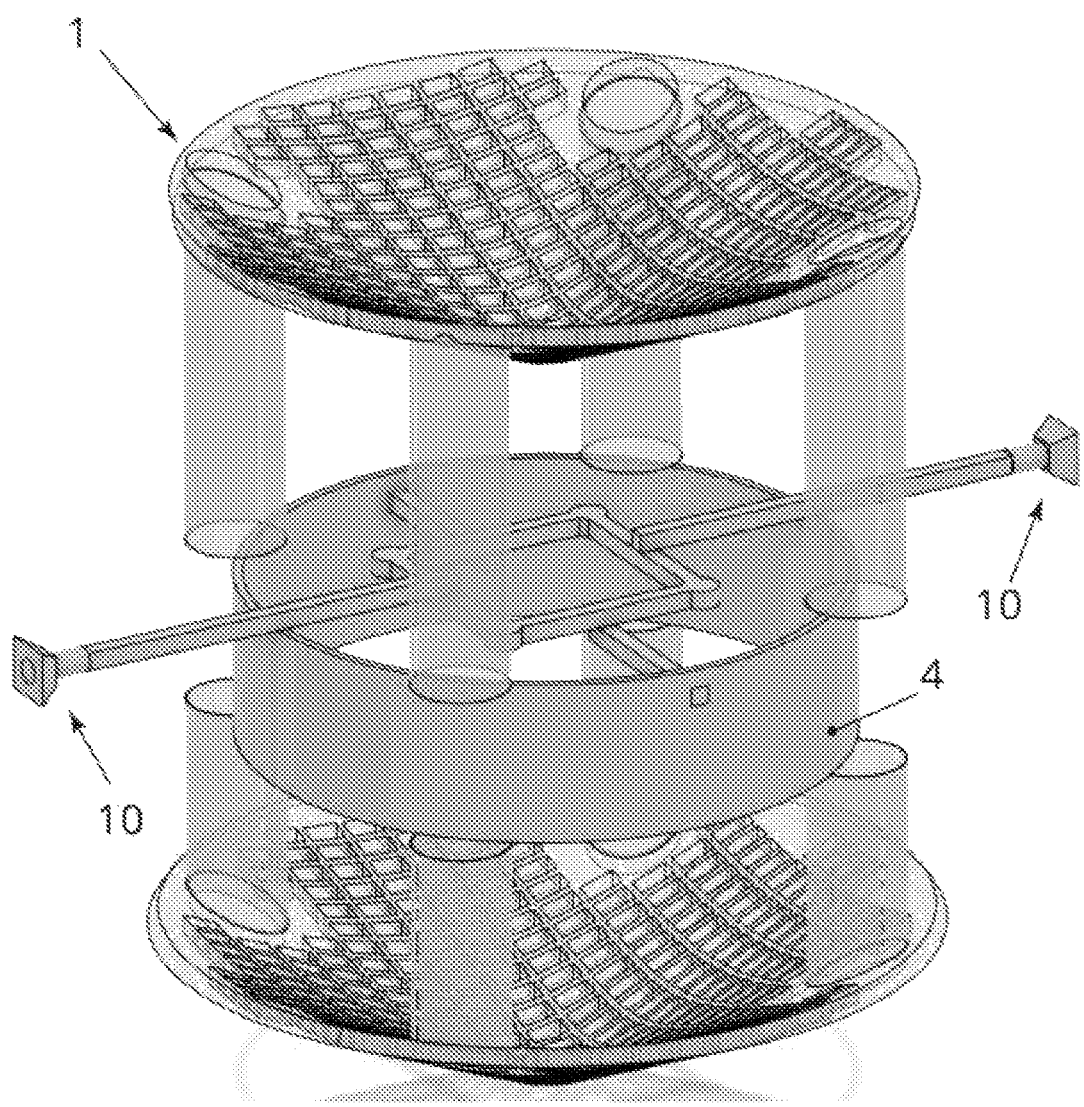
FIG. 4 is a perspective view of an embodiment of an interior shell of the device shown in FIG. 1.

Now referring to FIG. 4, there is shown an embodiment of the interior shell 1 of the device 22. The skilled addressee will appreciate that various alternative embodiments may be possible for the interior shell 1 of the device 22.

Figure 5:
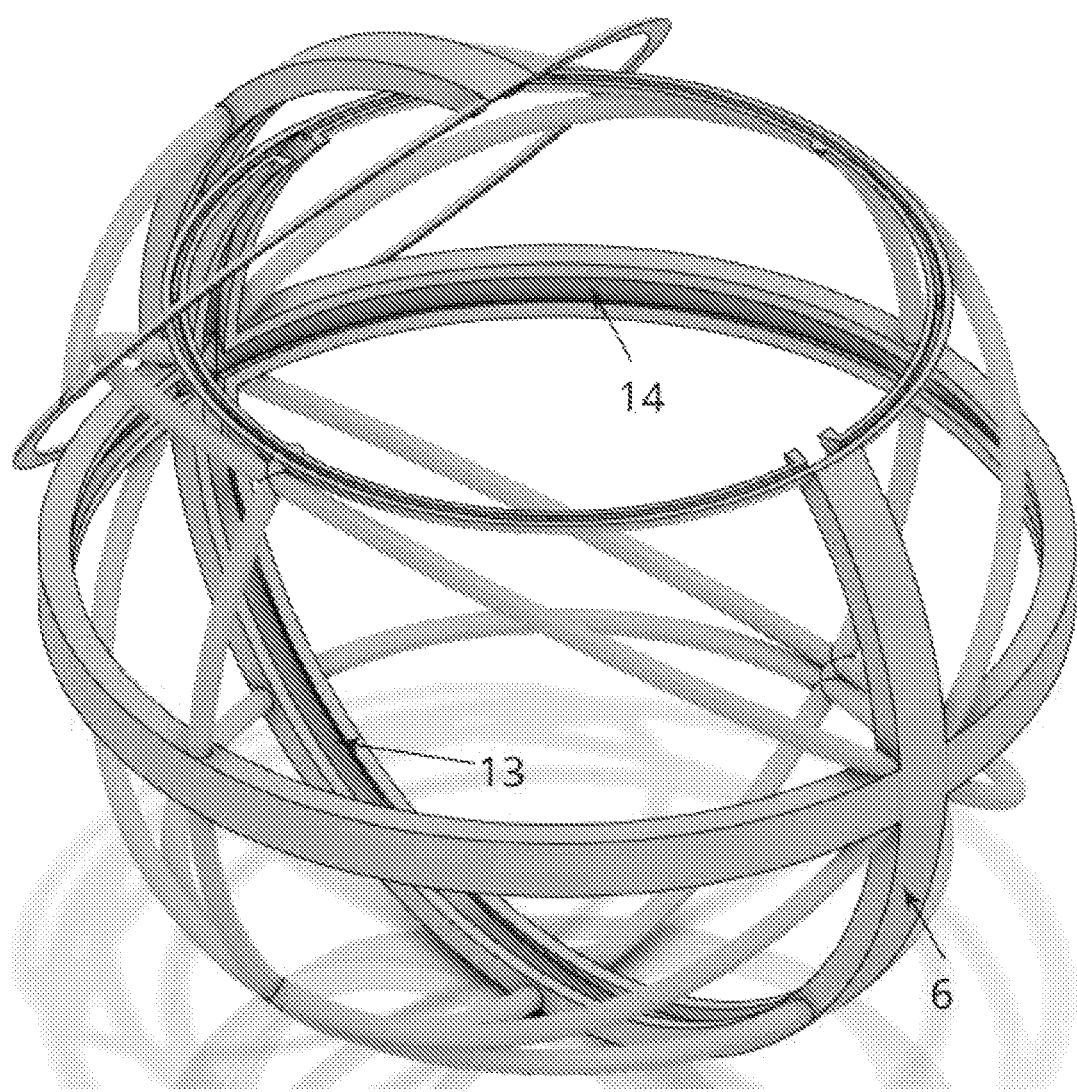
FIG. 5 is a perspective view of an embodiment of an outside shell of the device shown in FIG. 1.

Now referring to FIG. 5, there is shown an embodiment of the outside shell 6 of the device 22. It will be appreciated that the outside shell 6 comprises grooves 13 and 14, each of which is adapted for receiving the controllable biasing member 10 of the interior shell 1 which comprises a slider sized and shaped for moving within the grooves 13 and 14. The grooves 13 and 14 enable a motion of the interior shell 1 with respect to the outside shell 6 around two axes which are perpendicular one with respect to the other. While two grooves have been illustrated, it will be appreciated by the skilled addressee that more than two grooves may be provided in an alternative embodiment to provide more options. For instance six grooves may be alternatively used.

It will be therefore appreciated that the interior shell 1 may move in a controlled fashion with respect to the outside shell 6 when the controllable biasing member 10 is operated in the free state and the interior shell 1 may be secured at a desirable position when the controllable biasing member 10 is operated in the biasing state.

The skilled addressee will appreciate that various alternative embodiments may be possible for the outside shell 6. In particular, while the outside shell 6 has been illustrated with a spherical shape, the skilled addressee will appreciate that various alternative embodiments may be provided for the shape of the outside shell 6.

It will be appreciated that the device 22 may be secured to another device 22 according to various embodiments.

Figure 36:
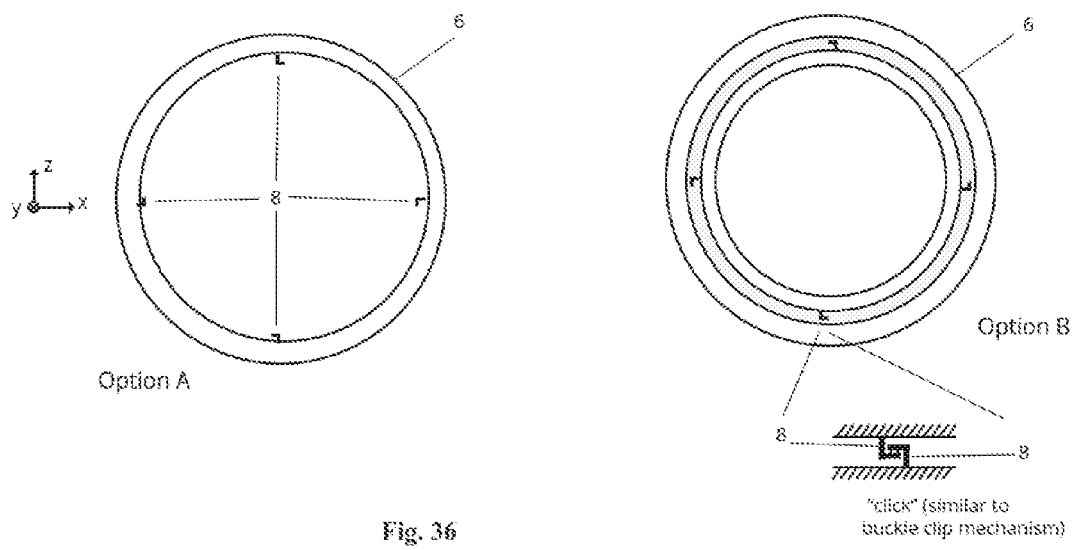
FIG. 36 is a diagram which illustrates two embodiments for performing a peer-to-peer clipping.

Now referring to FIG. 36, there is shown an embodiment for securing two devices 22 together. Each outside shell 6 of a corresponding device comprises at least one securing member 8 used for securing the outside shell 6 with another corresponding mating member. In the embodiment shown in FIG. 36, the securing member 8 comprises a hook.

The skilled addressee will also appreciate that various alternative embodiments may be possible for the securing member 8. It will be appreciated that an appropriate yawing motion may cause the two devices 22 to be secured to one another once each hook is engaged with a corresponding one on the other device 22. An opposite yawing motion will cause the two devices 22 to become unclipped from one another.

Figure 37:
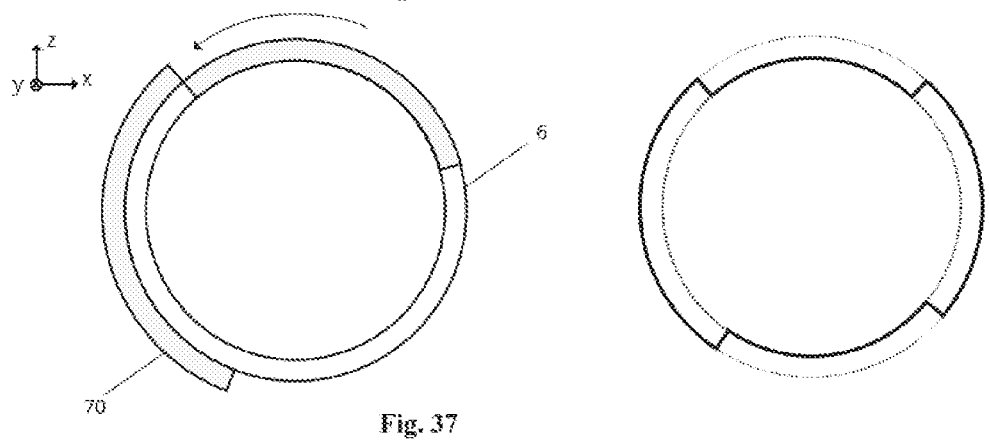
FIG. 37 is a diagram which illustrates a sliding cover on the outside shell in accordance with an embodiment.
Figure 38:
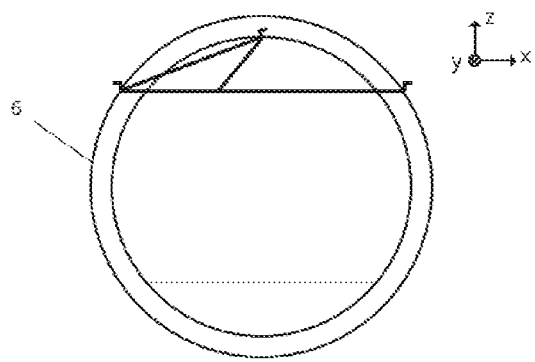
FIG. 38 is a diagram which illustrates a peer-to-peer clipping for distributive propulsion.

It will be further appreciated that each device 22 may have a removable cover 70 on the outside shell 6 in accordance with one embodiment disclosed in FIG. 37. It will be appreciated that the removable cover 70 has to be removed prior to clipping the device 22 with another device 22. The removable cover 70 is then returned to its original position after the payload sharing is completed and the devices 22 are unclipped.

Figure 18:
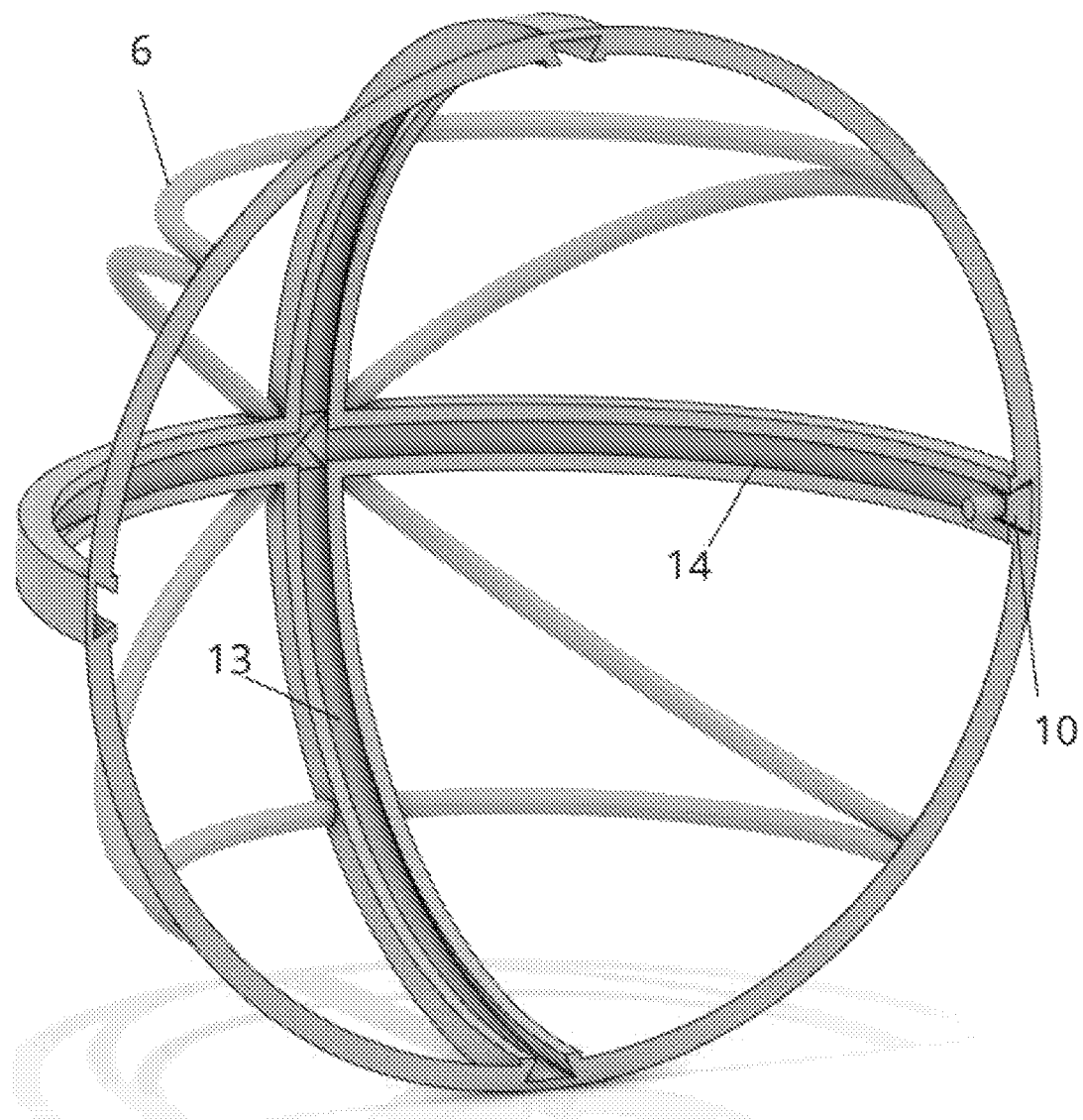
FIG. 18 is a perspective view illustrating another embodiment of half of the outside shell of the device showing groove and a slider.

Now referring to FIG. 18, there is shown a portion of the outside shell 6 illustrating shell grooves 13 and 14 and a slider, which is an element of the controllable biasing member 10, inserted in the shell groove 14.

Figure 19:
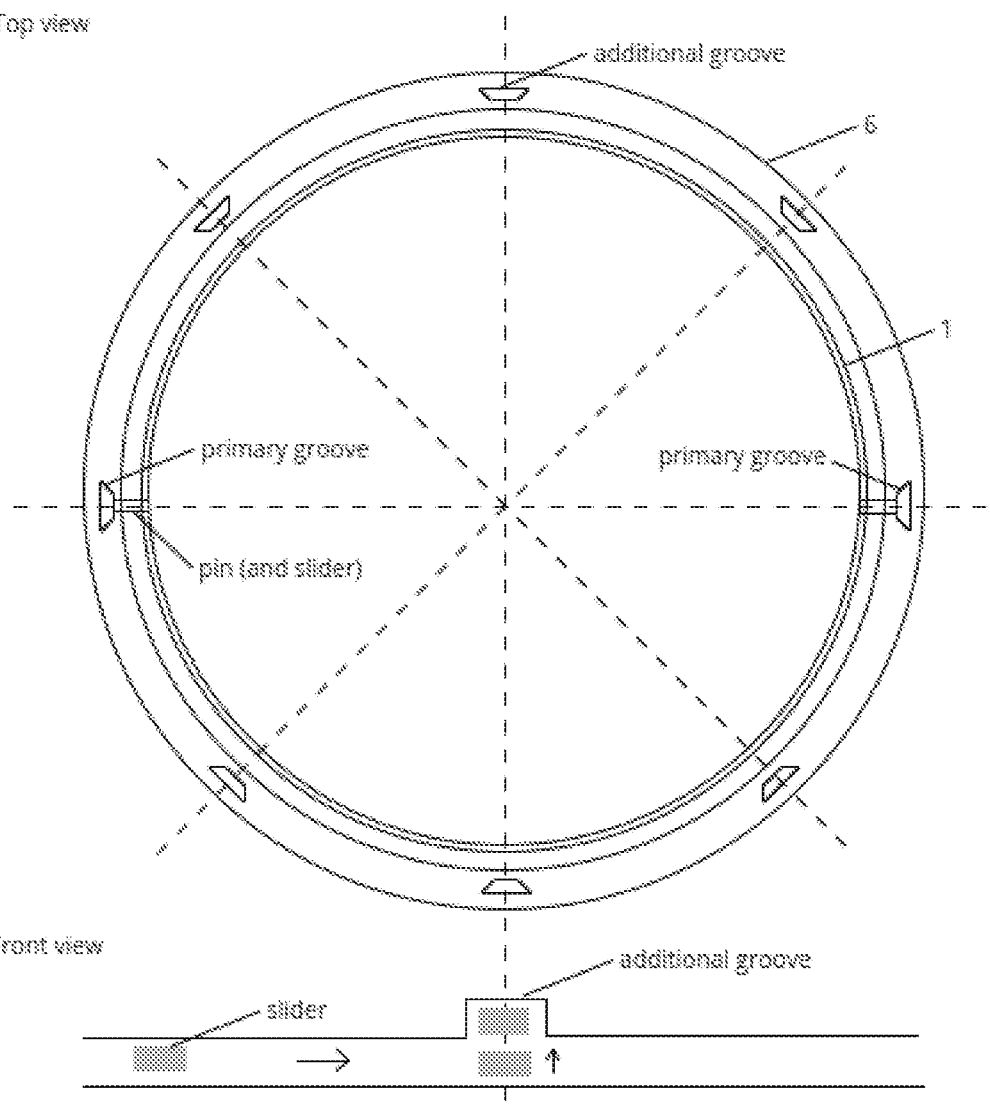
FIG. 19 is a schematic which illustrates additional grooves located in an embodiment of the outside shell and how a slider may be secured in one of the groove causing the outside shell to be secured with respect to the interior shell.

Now referring to FIG. 19, there is shown how the slider, which is an element of the controllable biasing member 10, may be clipped in the outside shell 6 in accordance with another embodiment and using additional groves. The clipping may be performed by moving outwardly the slider in a desired resting position.

The skilled addressee will appreciate that various alternative embodiments may be provided for securing the interior shell 1 with respect to the outside shell 6.

It will be appreciated that a transfer of the payload 5 between two devices may be achieved by at least securing the outside shell 6 of the device 22 using the securing member 8 with another outside shell of another device, not shown, operating the controllable biasing member 10 in the free state, moving the interior shell 1 of the device 22 with respect to the outside shell 6 of the device 22 along the grooves 13, 14 using the vehicle 2 and transferring the payload 5 accordingly.

Figure 22:
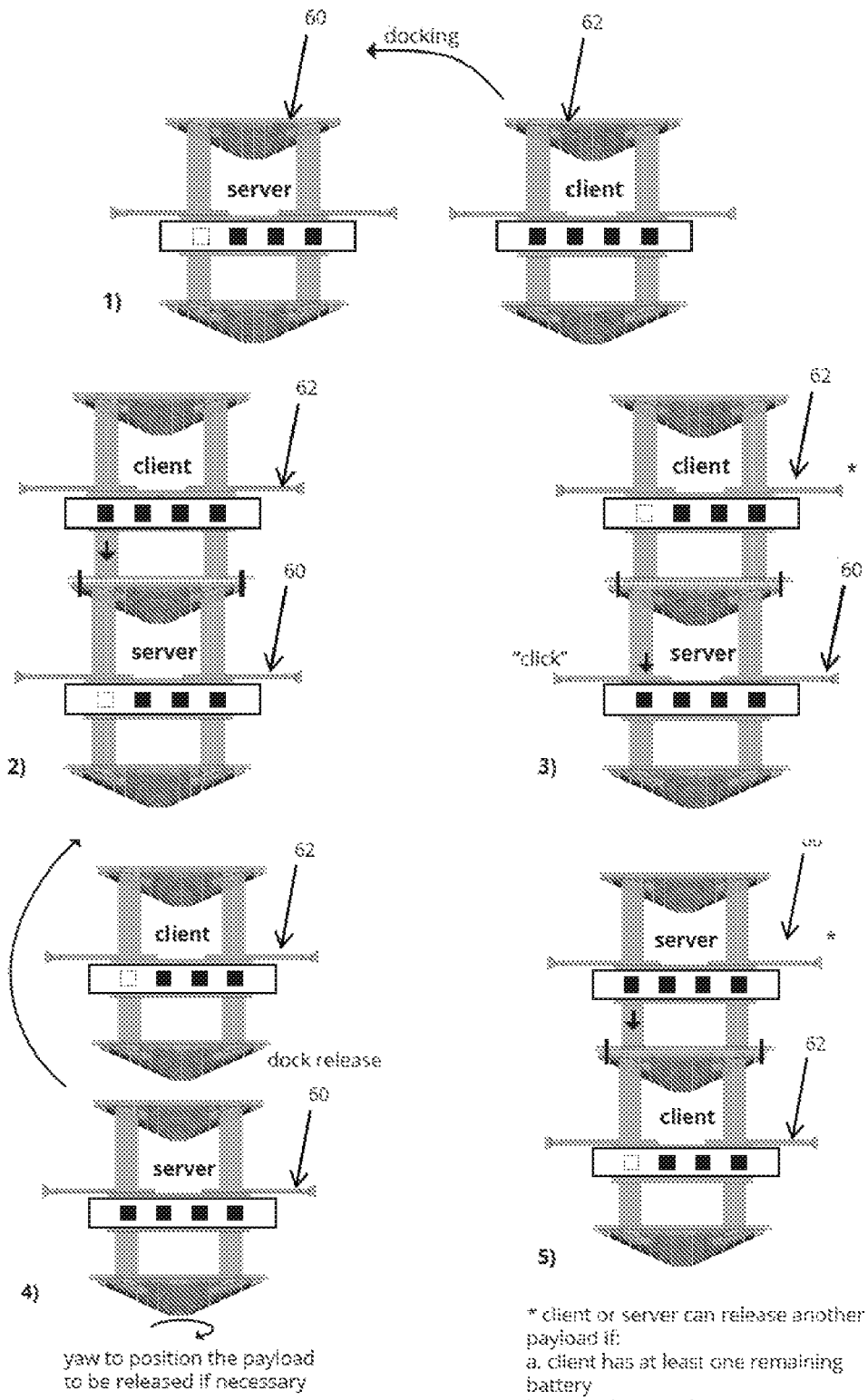
FIG. 22 is a diagram which shows the various steps for performing a payload swapping between two devices in the air.

Now referring to FIG. 22, there is illustrated how the swapping of a payload may be performed between two devices, respectively device 60 and device 62. It will be appreciated that the corresponding outside shell of each of the two devices 60 and 62 has been removed for clarity purposes.

According to a first step, the outside shell 6 of the device 60, not shown, is secured to another outside shell, not shown, of another device 62 using the securing member 8, also not shown.

According to a second step, the payload is released by the first device 62 located above the second device 60.

It will be appreciated that, thanks to gravity, the payload will fall via the opening 7 into the payload receiving unit of the second device 60, as shown in a third step.

According to a fourth step, the securing member 8, not shown, is released and the two devices 60 and 62 are separated accordingly.

It will be appreciated that one of the devices, i.e., device 60, may release another payload if the device 60 has at least one remaining payload, such as a battery, or the other device 62 has another empty slot.

Figure 23:
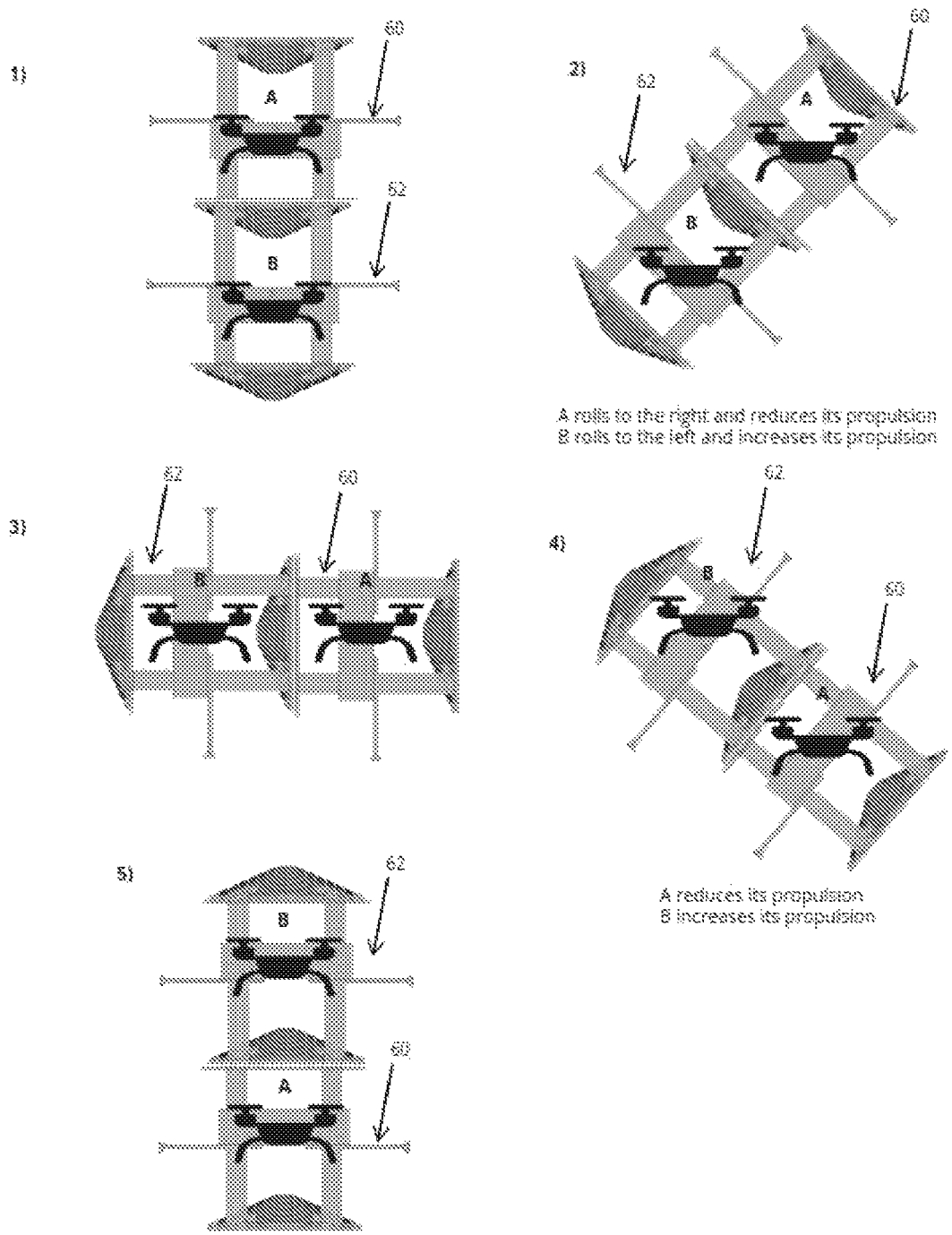
FIG. 23 is a diagram which shows the various steps for performing a payload swapping between two devices in the air.

Now referring to FIG. 23, it will be appreciated that the docking and the undocking steps shown in FIG. 22 may be avoided.

In fact, and as shown in FIG. 23, a flipping "8 maneuver" may be used to avoid undocking and docking steps in the peer-to-peer payload swapping as shown in step 4 of FIG. 22.

It will be appreciated that the idea is to flip the whole peer-to-peer system, i.e., the system comprises the device 60 and the device 62, which looks like a number 8, upside down instead of undocking and docking steps in the peer-to-peer payload swapping.

It will be therefore appreciated that drone A of the device 60 rolls to the right and reduces its propulsion, while drone B of the device 62 rolls to the left and increases its propulsion until the peer-to-peer system comes to a horizontal position as shown in the third step. After that, drone A of the device 60 reduces its propulsion while B of the device 62 increases its propulsion until the system is flipped completely upside down.

Figure 24:
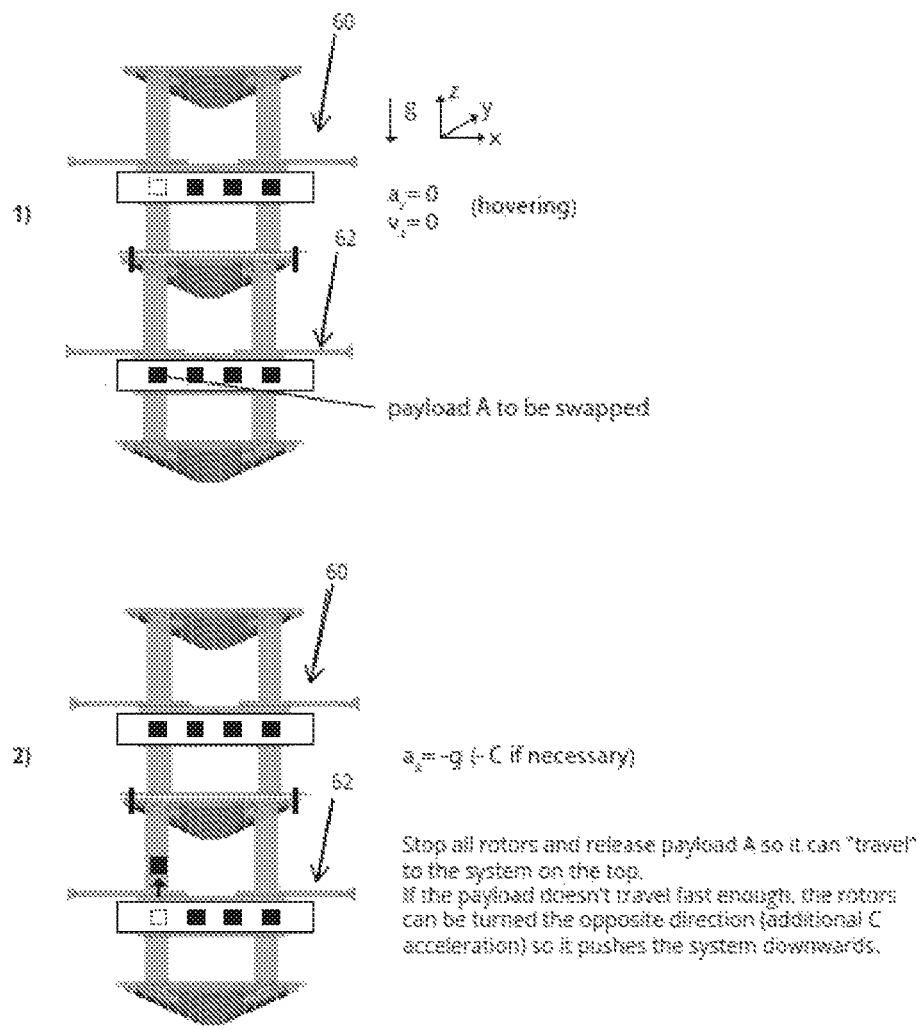
FIG. 24 is a diagram which shows the various steps for performing a payload swapping between two devices in the air.

Now referring to FIG. 24, it will be appreciated that the swapping of a payload may also be performed from the device 62 to the device 60 located above the device 62 against gravity.

It will be appreciated that the device and the methods disclosed for sharing a payload disclosed herein are of great advantage since they enable mid-air payload sharing for a variety of flying vehicles.

Second Embodiment of a Device for Sharing a Payload Between Two Vehicles

Figure 2:
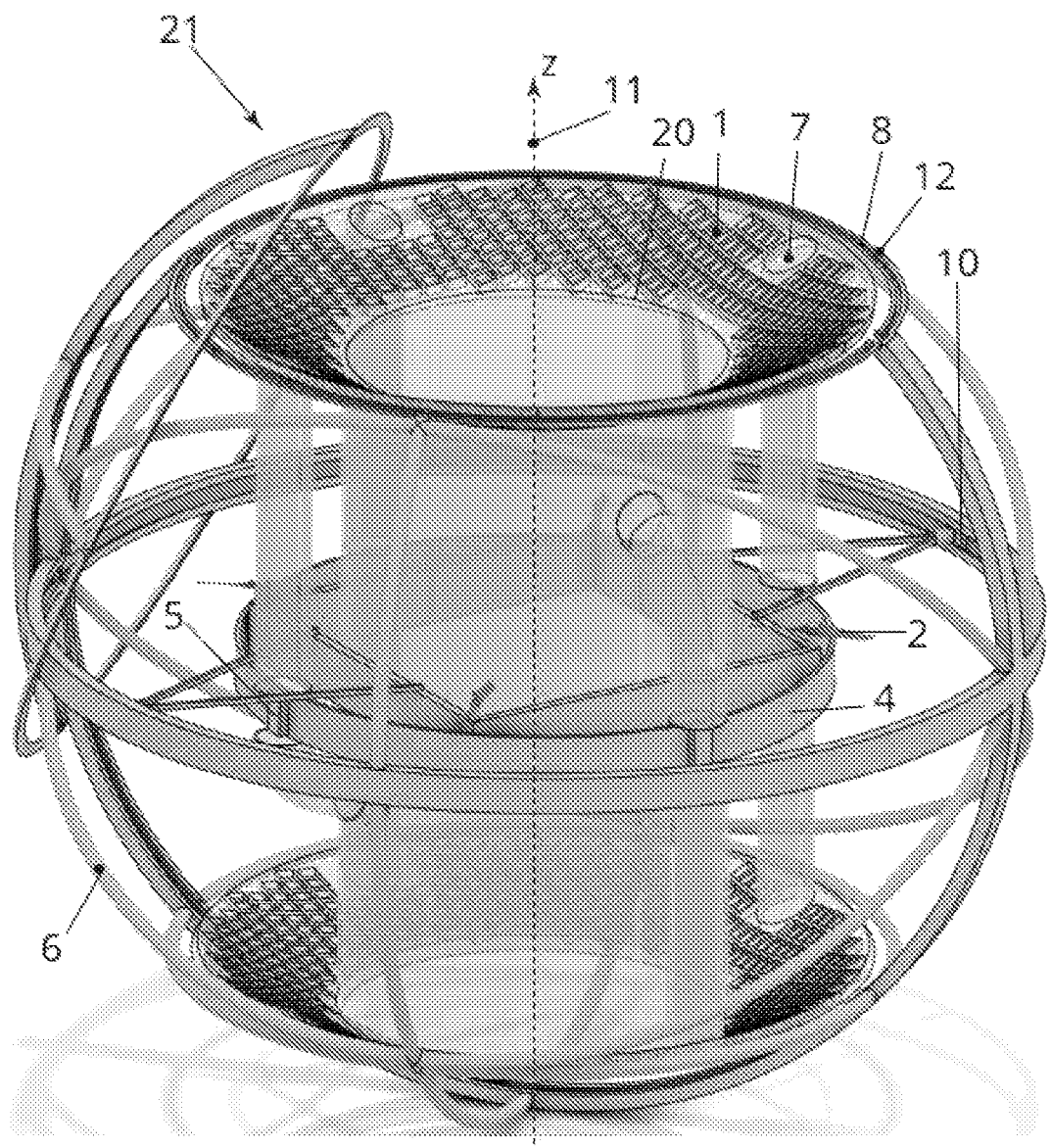
FIG. 2 is a perspective view of a device used for enabling a vehicle to share a payload with another vehicle in accordance with another embodiment. In this embodiment, the device receives therein another smaller device.

Now referring to FIG. 2, there is shown another embodiment of a device 21 used for sharing a payload with another device.

Figure 3:
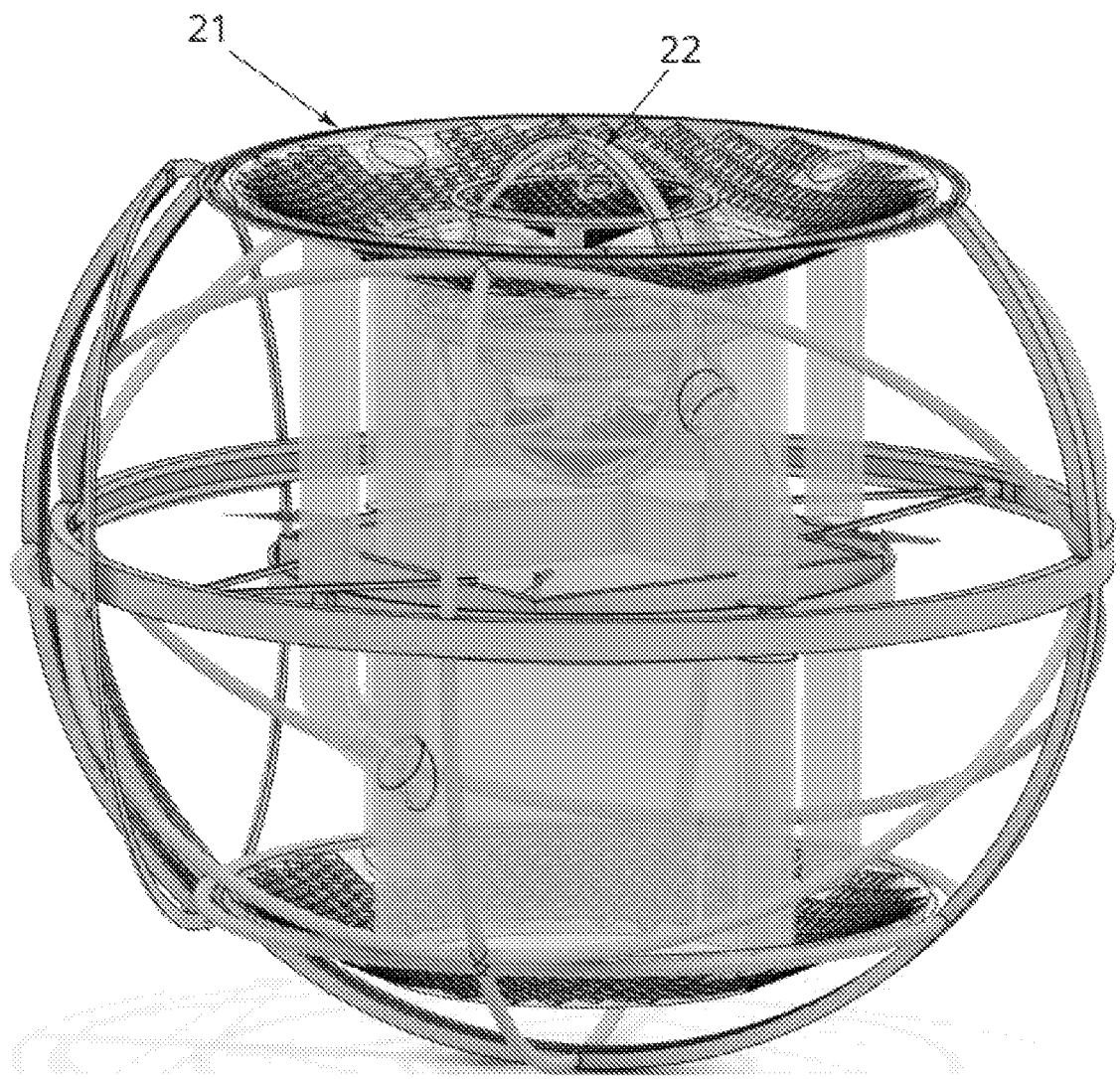
FIG. 3 is another perspective view of the device shown in FIG. 2 with another device therein.

It will be appreciated that, in this embodiment, the payload transfer between the device 21 and another device such as the device 22 shown in FIG. 3 is performed while the other device 22 is located inside the first device 21.

In this embodiment, the outside shell 1 of the device 21 therefore comprises at least one opening 20 sized and shaped for enabling the other device 22, substantially smaller, to which is secured a vehicle to enter inside the outside shell 1 of the device 21. It will be appreciated that, in one embodiment, the at least one opening 20 may be covered by a cover such as the cover 70 shown in FIG. 37.

It will be appreciated that such embodiment requires the other device 22 to be substantially smaller than the device 21.

Now referring to FIG. 3, there is shown an embodiment with the other device 22 located inside the first device 21.

Figure 6:
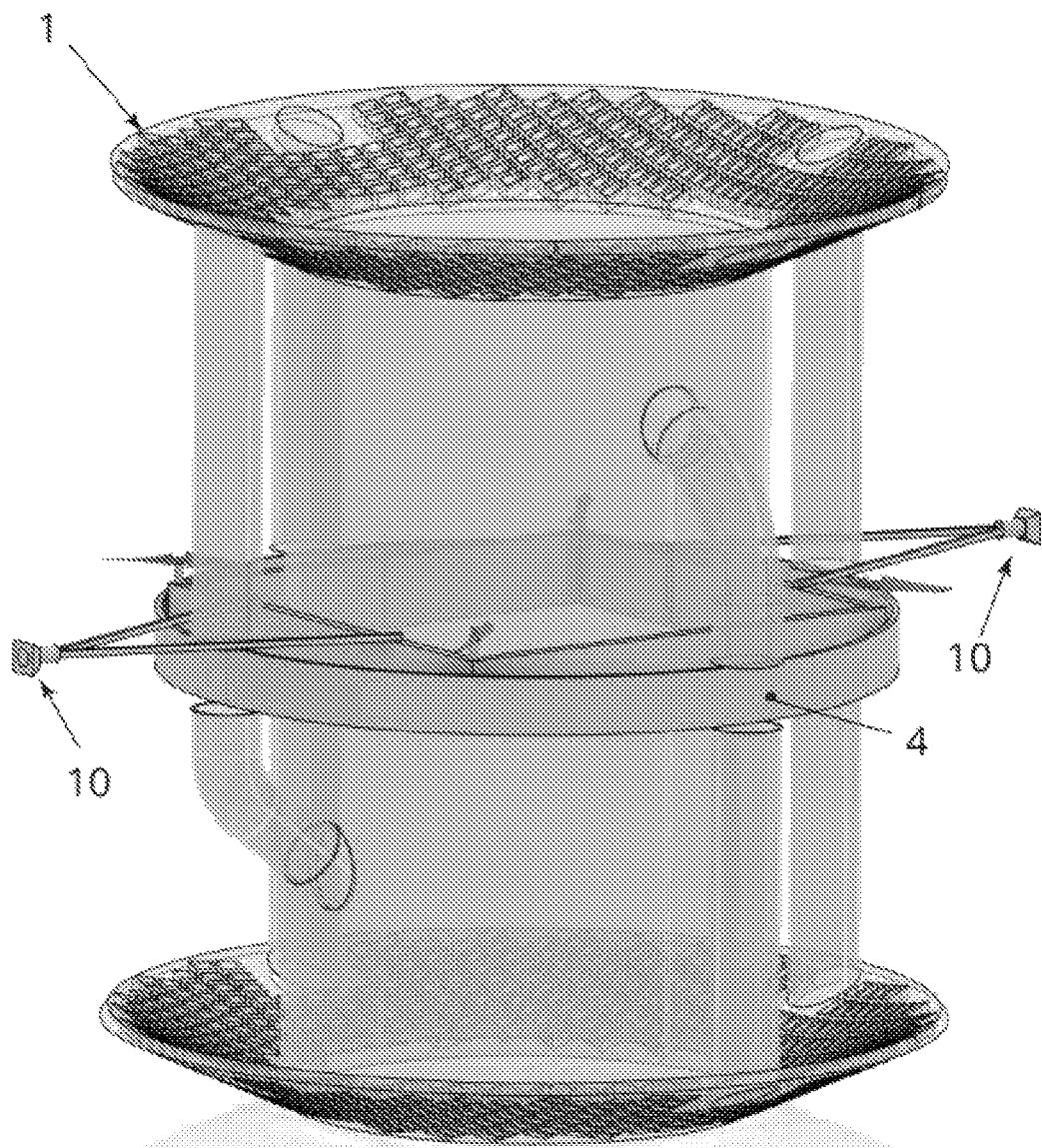
FIG. 6 is a perspective view of an embodiment of an interior shell of the device shown in FIG. 2.

Now referring to FIG. 6, there is shown an embodiment of the interior shell 1 of the device 21. It will be appreciated that the interior shell 1 of the device 21 comprises the controllable biasing member 10 which comprises a slider.

Figure 7:
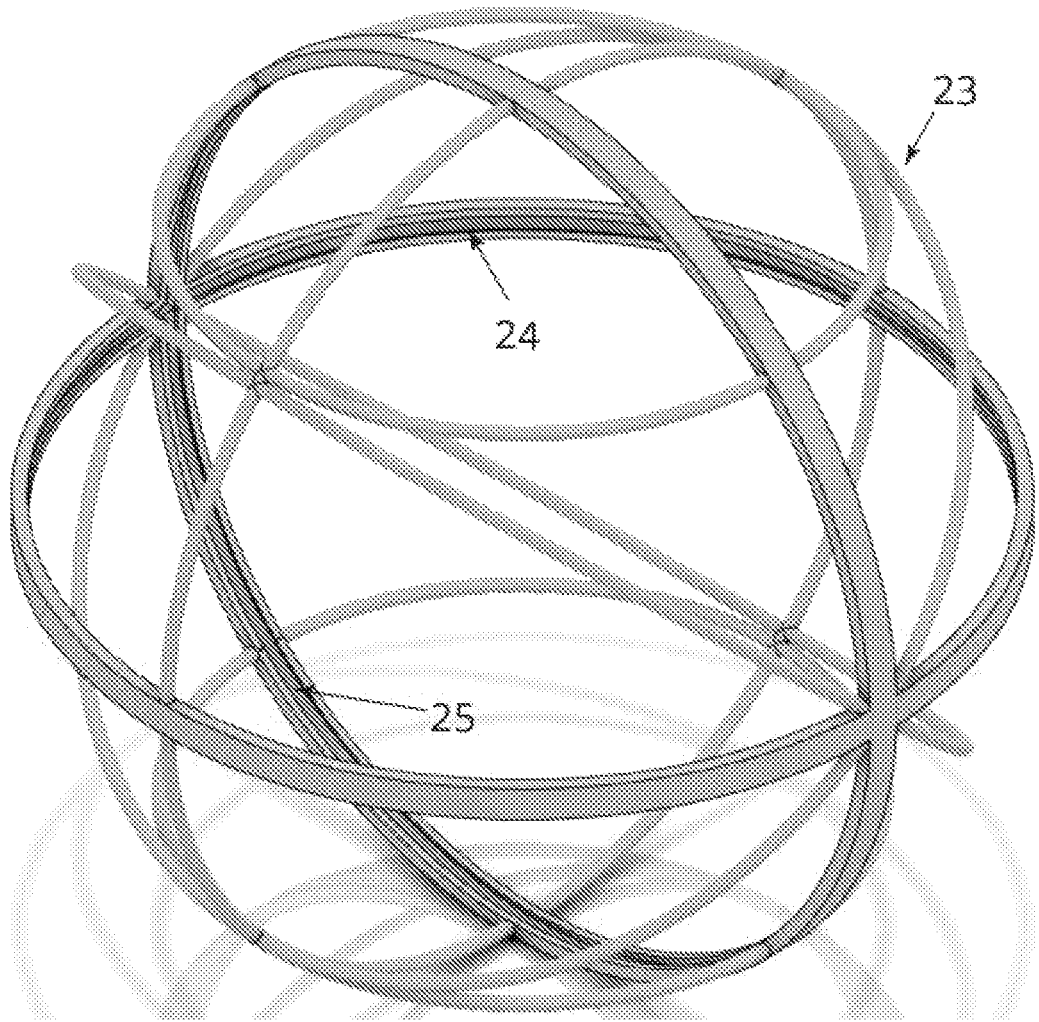
FIG. 7 is a perspective view of an embodiment of an outside shell of the device shown in FIG. 2.

Now referring to FIG. 7, there is shown an embodiment of the outside shell 23 of the device 21. It will be appreciated that the outside shell 23 comprises grooves 24 and 25, each adapted for receiving a corresponding controllable biasing member 10, comprising a slider, of the interior shell 1. It will be therefore appreciated that the interior shell 1 may move in controlled fashion with respect to the outside shell 23 and may be secured at a desirable position with respect to the interior shell 1 thanks to the controllable biasing member 10. While two grooves have been illustrated in this embodiment, it will be appreciated that more than two grooves may be provided in an alternative embodiment to provide more options. For instance, six grooves may be alternatively used.

The skilled addressee will appreciate that various alternative embodiments may be possible for the outside shell 23. In particular, while the outside shell 23 has a spherical shape, the skilled addressee will appreciate that various alternative embodiments may be provided for the shape of the outside shell 23.

Figure 20:
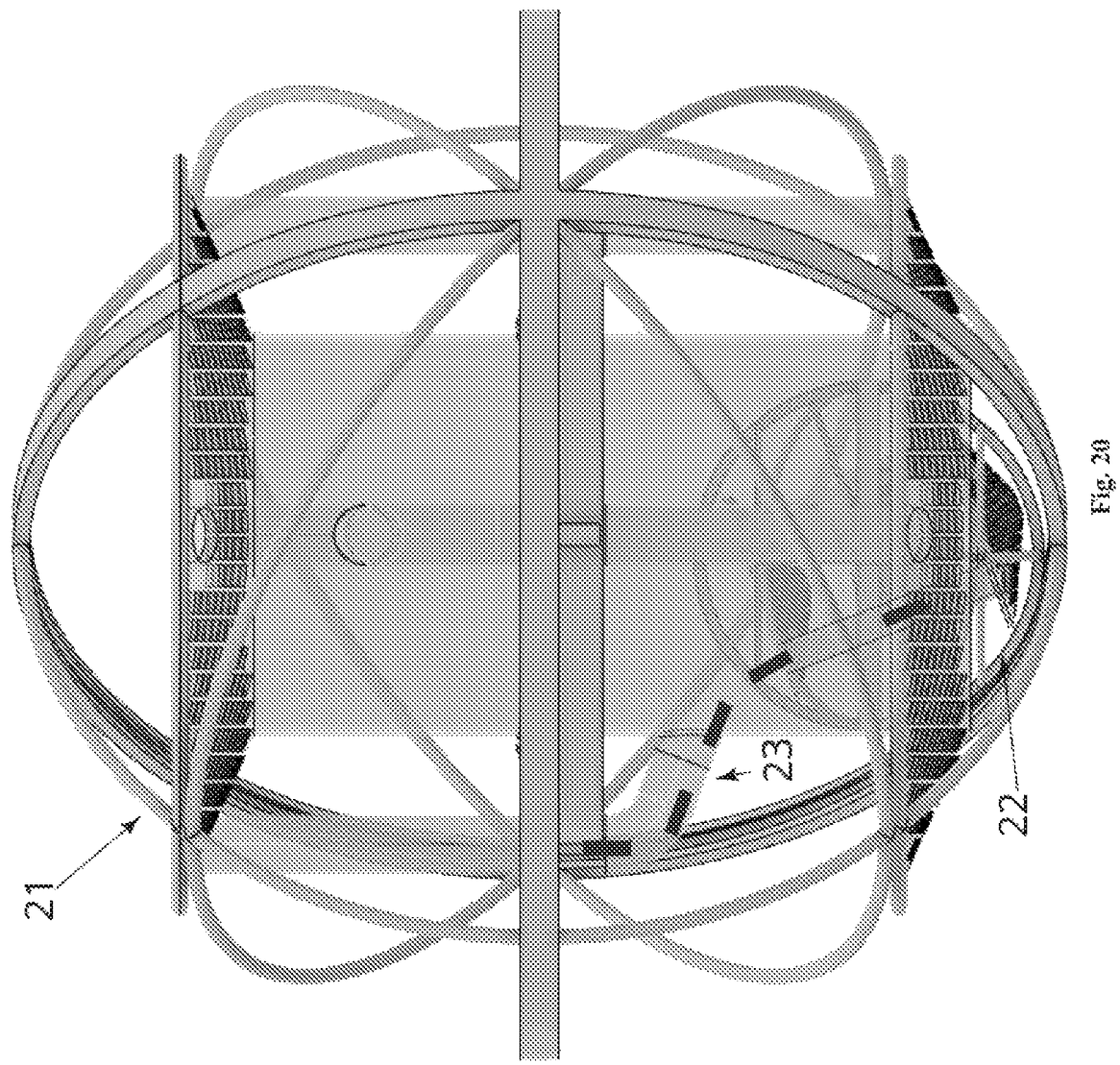
FIG. 20 is a schematic which illustrates an embodiment for performing a payload swapping from a first device to a second device in the embodiment where the second device is located within the first device and is receiving the payload.

Now referring to FIG. 20, there is shown how a transfer of a payload is achieved from the device 21 to the device 22.

It will be appreciated that in this embodiment the interior shell 1 of the device 21 comprises at least one tunnel, an example of which is tunnel 23, which is used for channeling a payload from the device 21 to a corresponding payload receiving unit located in the interior shell 1 of the device 22.

Figure 21:
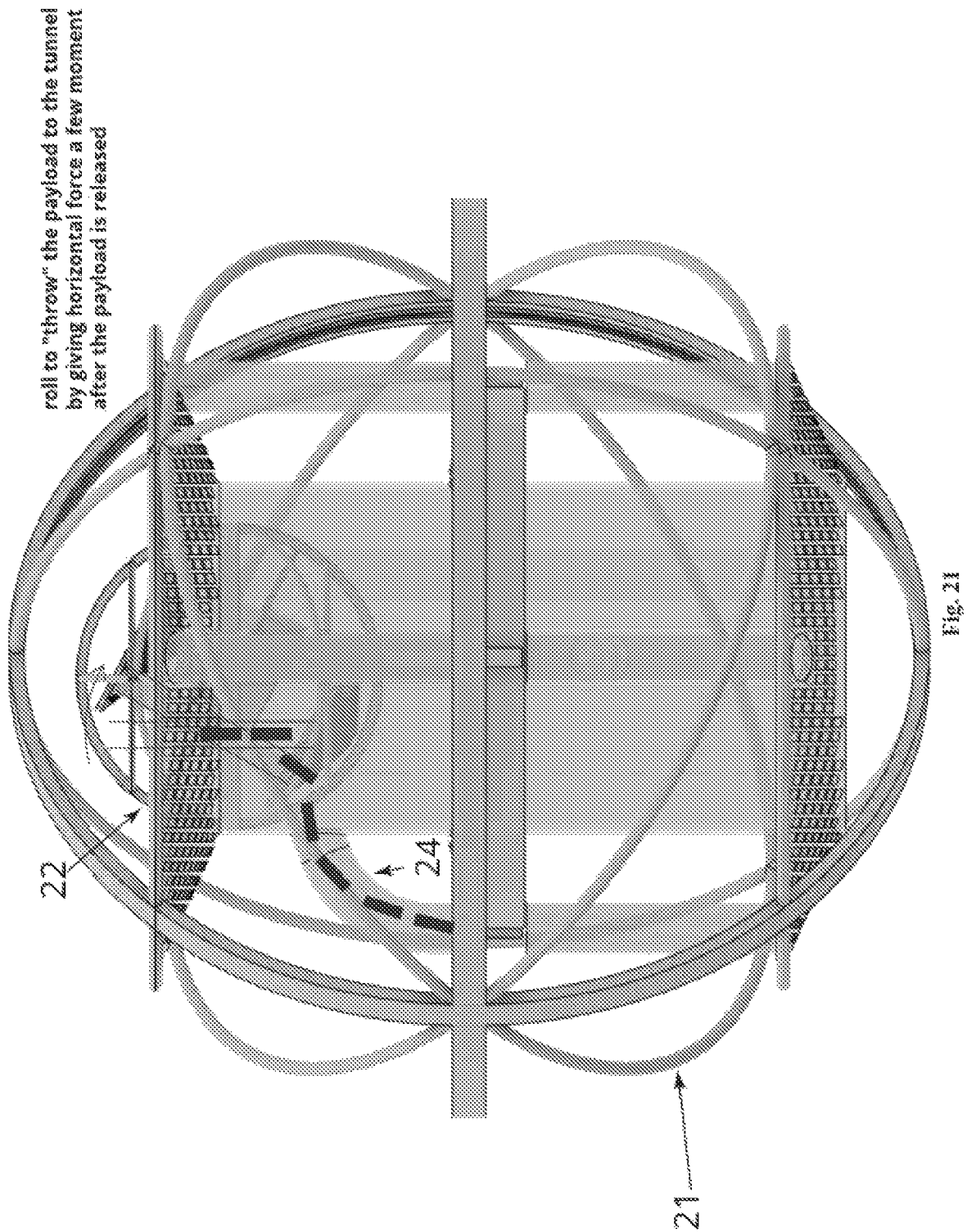
FIG. 21 is a schematic which illustrates an embodiment for performing a payload swapping from a second device to a first device in the embodiment where the second device is located within the first device and is receiving the payload.

Now referring to FIG. 21, there is shown how a transfer of a payload is achieved from the device 22 to the device 21. It will be appreciated that in this embodiment the interior shell 1 of the device 21 comprises at least one tunnel, an example of which is tunnel 24, which is used for channeling a payload from the device 22 to a corresponding payload receiving unit located in the interior shell of the device 21.

It will be appreciated that in both cases shown in FIGS. 20 and 21, the device 22 is positioned at a precise given position suitable for performing the corresponding payload sharing. The skilled addressee will appreciate that various alternative embodiments may be provided for sharing the payloads between the device 21 and the device 22.

Figure 16:
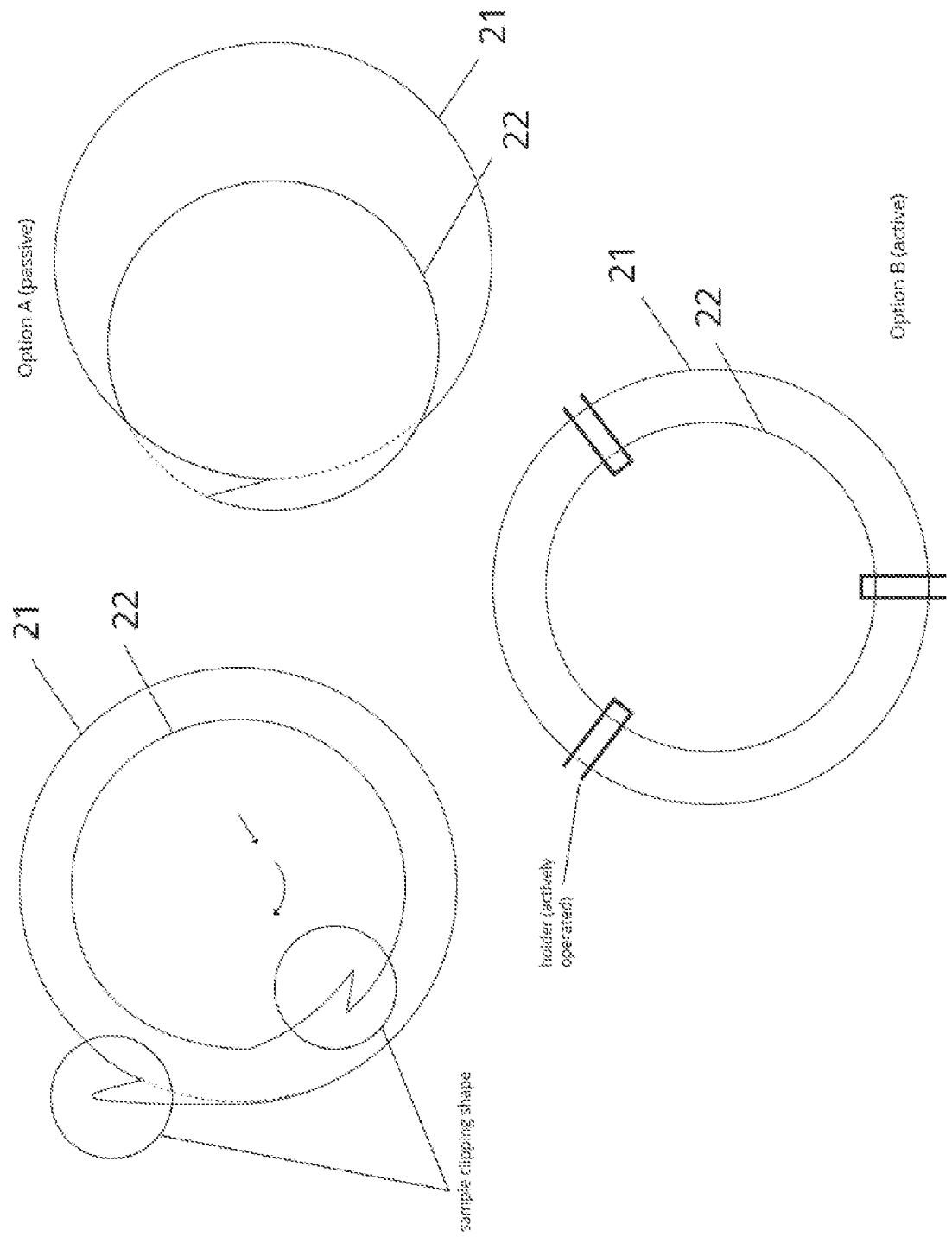
FIG. 16 is a diagram which shows various embodiments for clipping a device within another device.

Now referring to FIG. 16, there are shown three different embodiments used for securing the device 22 to the device 21. The skilled addressee will appreciate that various alternative embodiments may be provided.

Figure 25:
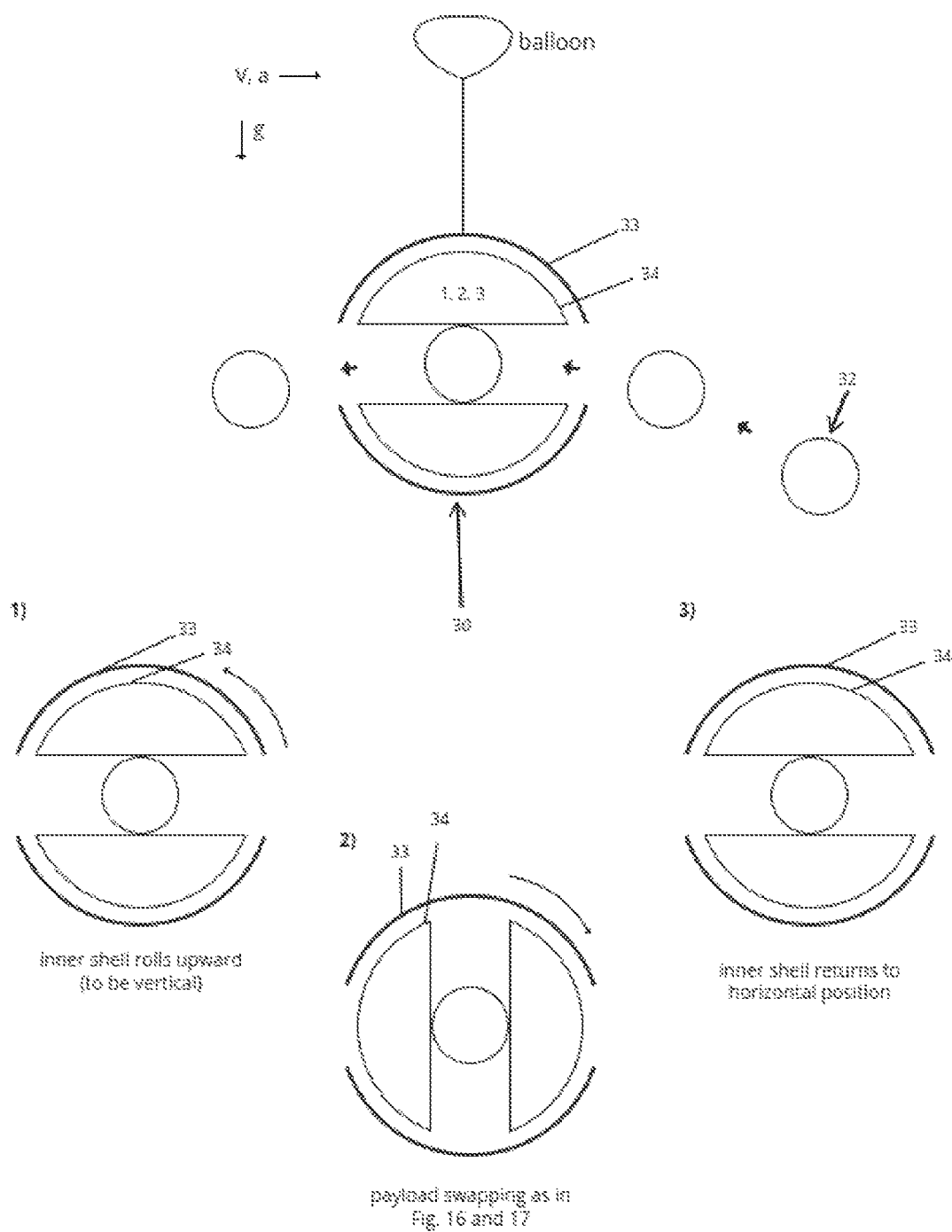
FIG. 25 is a diagram which shows how a payload swapping may be performed in accordance with another embodiment between two devices in the air wherein one of the devices enters into another device.

Now referring to FIG. 25, there is shown another embodiment for enabling two devices to share a payload. In this embodiment, a device 30 receives a smaller device 32. The device 30 comprises inter alia an outside shell 33 and an interior shell 34.

It will be appreciated that, once the device 32 is located inside the device 30, the interior shell 34 may be moved with respect to the outside shell 33 as disclosed in FIG. 25 and the payload sharing may then happen. The device 30 may be a standalone device or may be carried by another flying vehicle such as for instance a helicopter, a balloon or a drone.

It will be appreciated that the embodiments of the device may be of great advantage for sharing payloads with a plurality of smaller devices.

Third Embodiment of a Device for Sharing a Payload Between Two Vehicles

Now referring to FIGS. 8, 9, 10 and 11, there is shown another embodiment of a device which may be used for sharing a payload with another device in the case where the vehicle on which each of the two devices is mounted is a four-wheeled vehicle.

The device comprises an interior shell 1 receiving therein the vehicle. The interior shell 1 further comprises at least one payload receiving unit 4. Each payload receiving unit 4 is suitable for receiving a corresponding payload 5. In the embodiment illustrated in those figures, two payloads may be provided per device.

It will be appreciated that the device further comprises an outside shell 6 surrounding the interior shell 1. It will be further appreciated that a securing member 8 located on the outside shell 6 is used for securing the outside shell 6 with a corresponding mating member located on another device with which a transfer of payload has to be performed.

As shown in FIG. 8, a server 40 approaches a client 42. In this embodiment, the server 40 has an empty slot available for receiving a payload from the client 42. Each of the server 40 and the client 42 comprises a device for sharing a payload as explained above.

As shown in FIG. 9, the server 40 connects to the client 42 using its outside shell 6 and the securing member 8. The client 42 drops a payload on its outside shell 1. Both controllable biasing members 10 of each of the client 42 and the server 40 are operated to be in a free state causing the outside shell 6 of each of the client 42 and the server 40 to be moveable with respect to its respective interior shell 1 of each of the client 42 and the server 40.

Both the client 42 and the server 40 then move forward. In other words, there is a respective motion of the interior shell 6 with respect to the outside shell 1 for each of the client 42 and the server 40.

As shown in FIG. 10, the server 40 then picks up the payload located on the outside shell 6 and then drops the other payload.

As shown in FIG. 11, both the client 42 and the server 40 move backward so the client 42 can pick up the payload on the outside shell 6. It will be appreciated that both the client 42 and the server 40 move forward to return to their default position as shown in FIG. 9. The controllable biasing member is then operated in the biasing state, and the client 42 and the server 40 disconnect themselves since the payload swapping is now completed.

It will be appreciated that the purpose of FIGS. 8-11 is to illustrate the concept of sharing a payload between two devices in the embodiment where the vehicle on which is mounted each of the two devices is a four-wheeled vehicle. The skilled addressee will therefore appreciate that many embodiments may be provided for each of the interior shell 6, the outside shell 1, the controllable biasing member 10, the payload receiving unit 4, the securing member 8, etc.

Fourth Embodiment of a Device for Sharing a Payload Between Two Vehicles

Now referring respectively to FIGS. 12, 13, 14 and 15, there are shown another embodiment of the device which may be used for sharing a payload with another device in the case where the vehicle is a four-wheeled vehicle.

It will be appreciated that in this embodiment an assembly comprising device 46 with a corresponding vehicle is substantially larger than an assembly comprising device 44 with a corresponding vehicle.

According to a first step shown in FIG. 12, the device 44 approaches the device 46.

According to a second step shown in FIG. 13, device 44 is secured to the device 46 via the outside shell 6 of the device 44. The controllable biasing member 10 of the device 44 is operated to be in the free state such that the interior shell 1 of the device 44 is moveable with respect to the outside shell 6 of the device 44. The device 44 then moves forward. In other terms, the vehicle to which the interior shell 1 is secured moves forward with respect to the outside shell 6 of the device 44.

According to a third step shown in FIG. 14, the payload receiving unit 4 of the device 44 drops a payload and according to a fourth step shown in FIG. 15, the vehicle to which the interior shell 1 of the device 44 is secured moves backwards with respect the outside shell 6 to pick up a payload. The device 44 returns to its default position as shown in FIG. 13, the controllable biasing member 10 of the device 44 is operated in the biasing state and the device 44 unclips from the device 46.

It will be appreciated that the purpose of FIGS. 12-15 is to illustrate the concept of sharing a payload between two devices in the embodiment where the vehicle on which each of the two devices is mounted is a four-wheeled vehicle. The skilled addressee will therefore appreciate that many embodiments may be provided for each of the interior shell 6, the outside shell 1, the controllable biasing member 10, the payload receiving unit 4, the securing member 8, etc.

Fifth Embodiment of a Device for Sharing a Payload Between Two Vehicles

Now referring to FIGS. 32, 33, 34 and 35, there is shown another embodiment wherein the device may be used for sharing a payload with another device in the case where the vehicle is a moving mechanism used for creating a rolling sphere.

Figure 32:
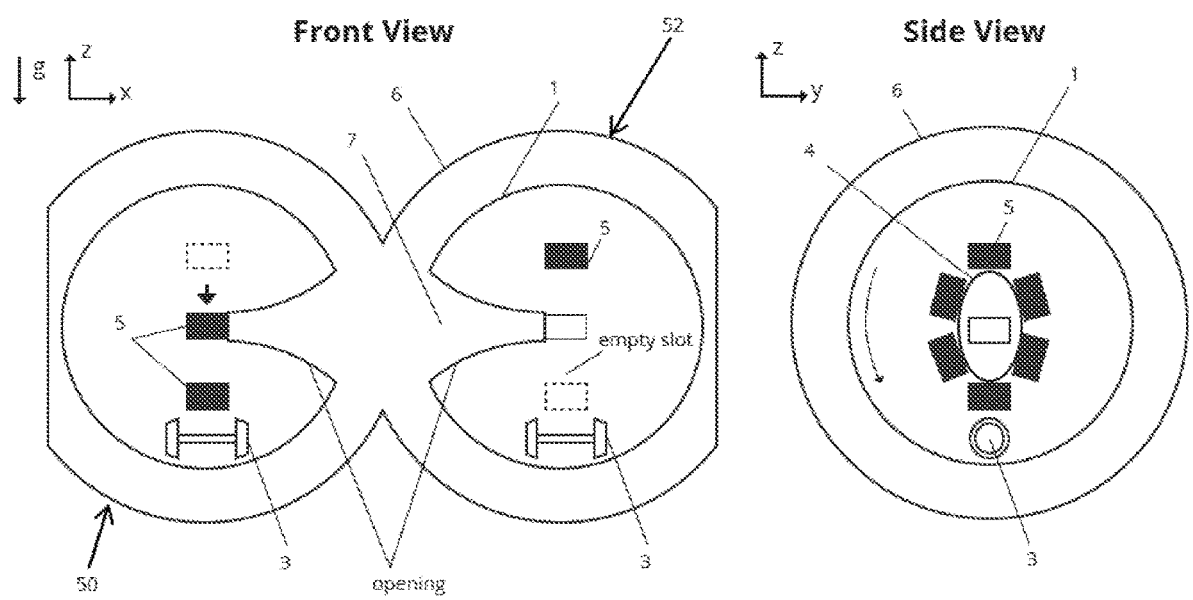
FIG. 32 is a diagram which illustrates another embodiment of the device which is installed with two rolling spheres.

As shown in FIG. 32, devices 50 and 52 are connected via the securing member 8, not shown. It will be appreciated that in each of the devices 50 and 52, a moving mechanism 3, which might include a wheel, a pendulum. etc, is abutting the interior shell 1 and causes a resulting rolling sphere to move, as known to the skilled addressee.

It will be appreciated that each of the devices 50 and 52 has an outside shell 6 comprising an opening 7 sized and shaped for transferring a given payload between inside and outside of the outside shell 6. There is also disclosed an embodiment of the payload receiving unit 4 which is adapted for receiving a corresponding payload.

Figure 33:
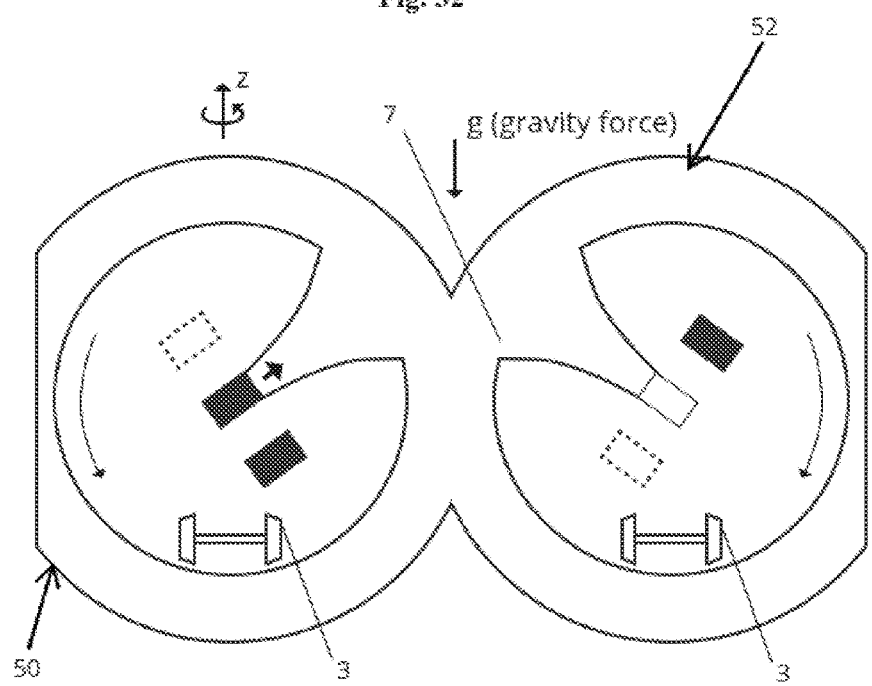
FIG. 33 is a diagram which shows how the two rolling spheres are tilted for enabling a payload sharing.

Now referring to FIG. 33, there is shown how each device 50 and 52 is tilted while being connected with one another. This may be performed by first connecting each of the outside shell of the devices 50 and 52 via a securing member, then actuating the controllable biasing member, not shown, of each of the devices 50 and 52 in the free state and moving accordingly each interior shell 1 with respect to its corresponding outside shell 6 so that the desired position is obtained. It will be appreciated that the controllable biasing member, not shown, of each of the devices 50 and 52 may then be actuated in the biasing state to maintain the desired position.

Figure 34:
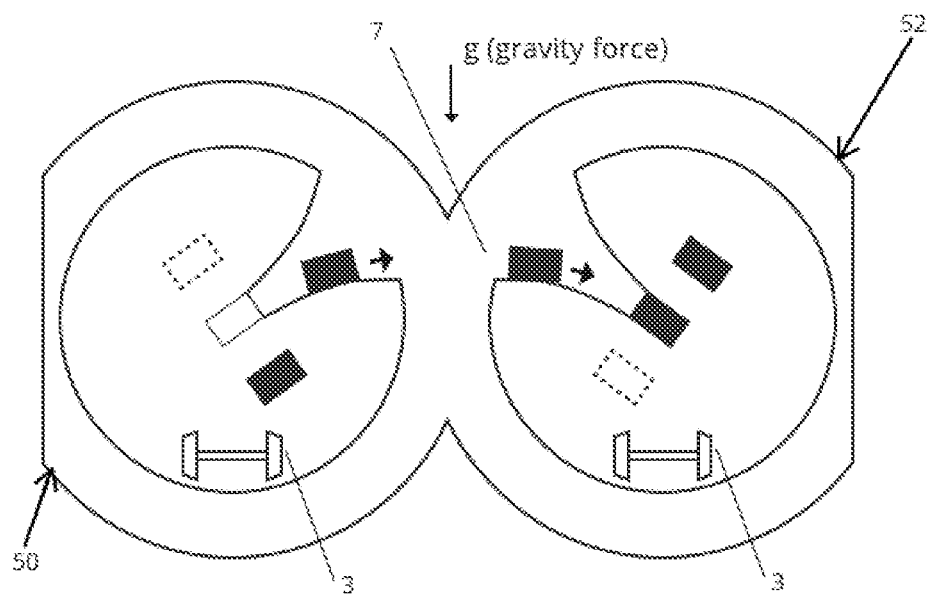
FIG. 34 is a diagram which shows how a payload is shared and travels due to centrifugal force.
Figure 35:
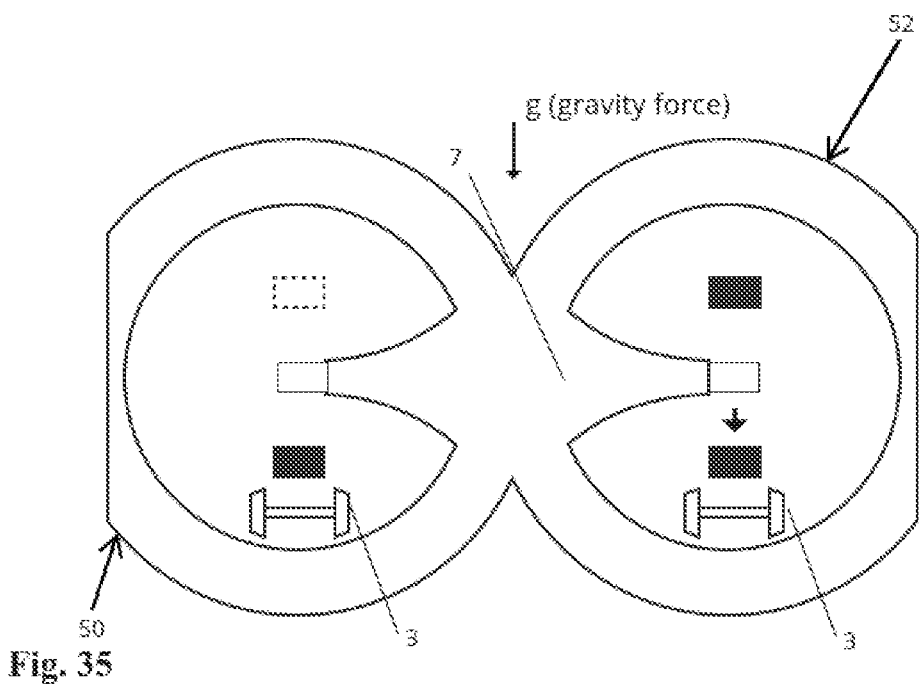
FIG. 35 is a diagram which shows how both devices return to a horizontal position following a payload sharing.

As shown in FIG. 34, it will be appreciated that a rotation of each of the devices 50 and 52 may then create a centrifugal force which will cause a payload to transfer outside the device 50. The payload will may then be received within the device 52.

It will be appreciated that that at some point both the device 50 and the device 52 may return to a horizontal position. This may be performed by actuating the controllable biasing member of each of the devices 50 and 52 in the free state, moving each of the interior shell 1 with respect to its corresponding outside shell 6 such that a desired horizontal position is obtained, and then actuating the controllable biasing member of each of the devices 50 and 52 in the biasing state. The payload received in the device 52 may then be secured in the payload receiving unit 4.

The skilled addressee will appreciate that various alternative embodiments may be provided for the device when the vehicle 3 is a rolling ball and that the embodiments disclosed in FIG. 32-35 are only provided to illustrate the concept of sharing a payload with such vehicles.

Sixth Embodiment of a Device for Sharing a Payload Between Two Vehicles

It will be appreciated that the device disclosed above may be used for performing a peer-to-peer clipping for achieving distributive propulsion in the embodiment where the vehicle is a flying vehicle as disclosed in FIGS. 39, 40, 41 and 42. Various shapes may be formed with a plurality of devices.

Figure 39:
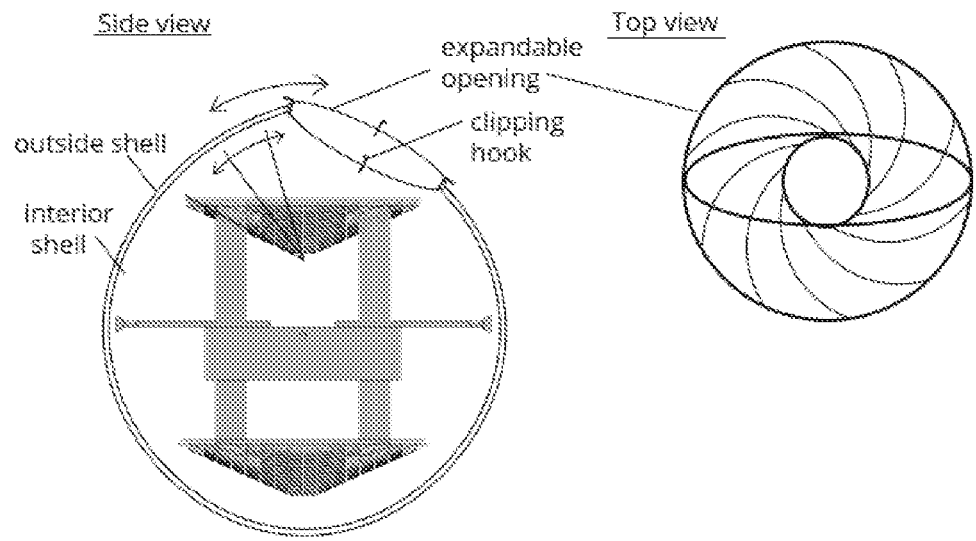
FIG. 39 is a diagram which illustrates a peer-to-peer clipping in the embodiment wherein the device is used for providing a distributive propulsion.
Figure 40:
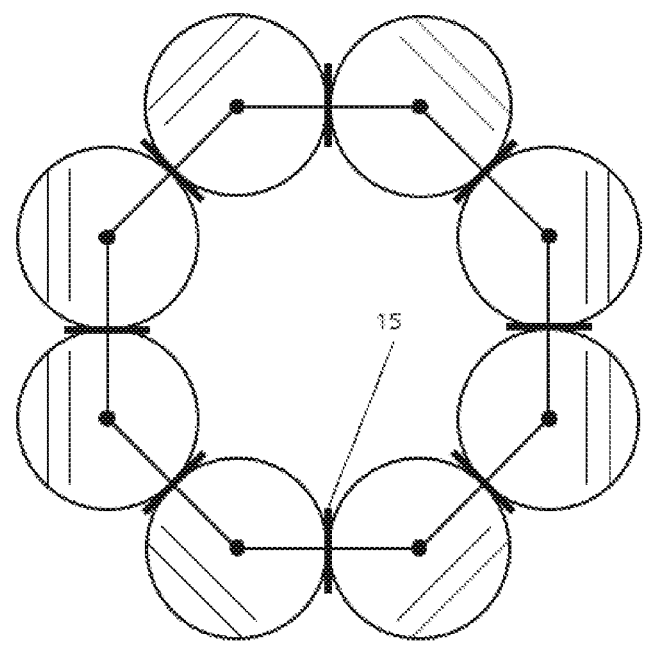
FIG. 40 is a diagram which illustrates a payload swapping in a distributive propulsion.
Figure 41:
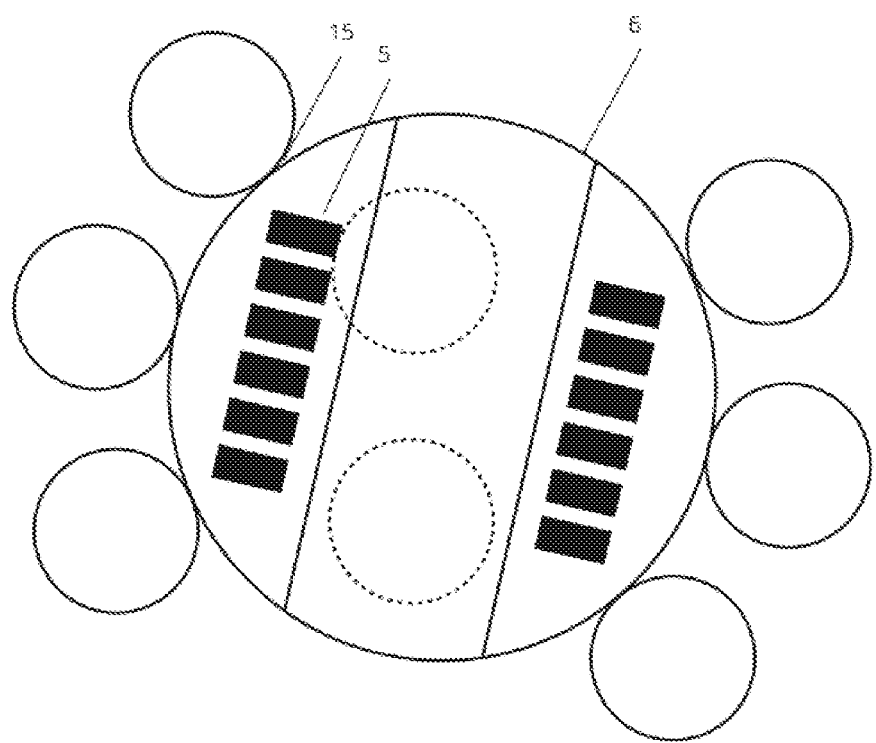
FIG. 41 is a diagram which illustrates a distributive propulsion between a plurality of devices.
Figure 42:
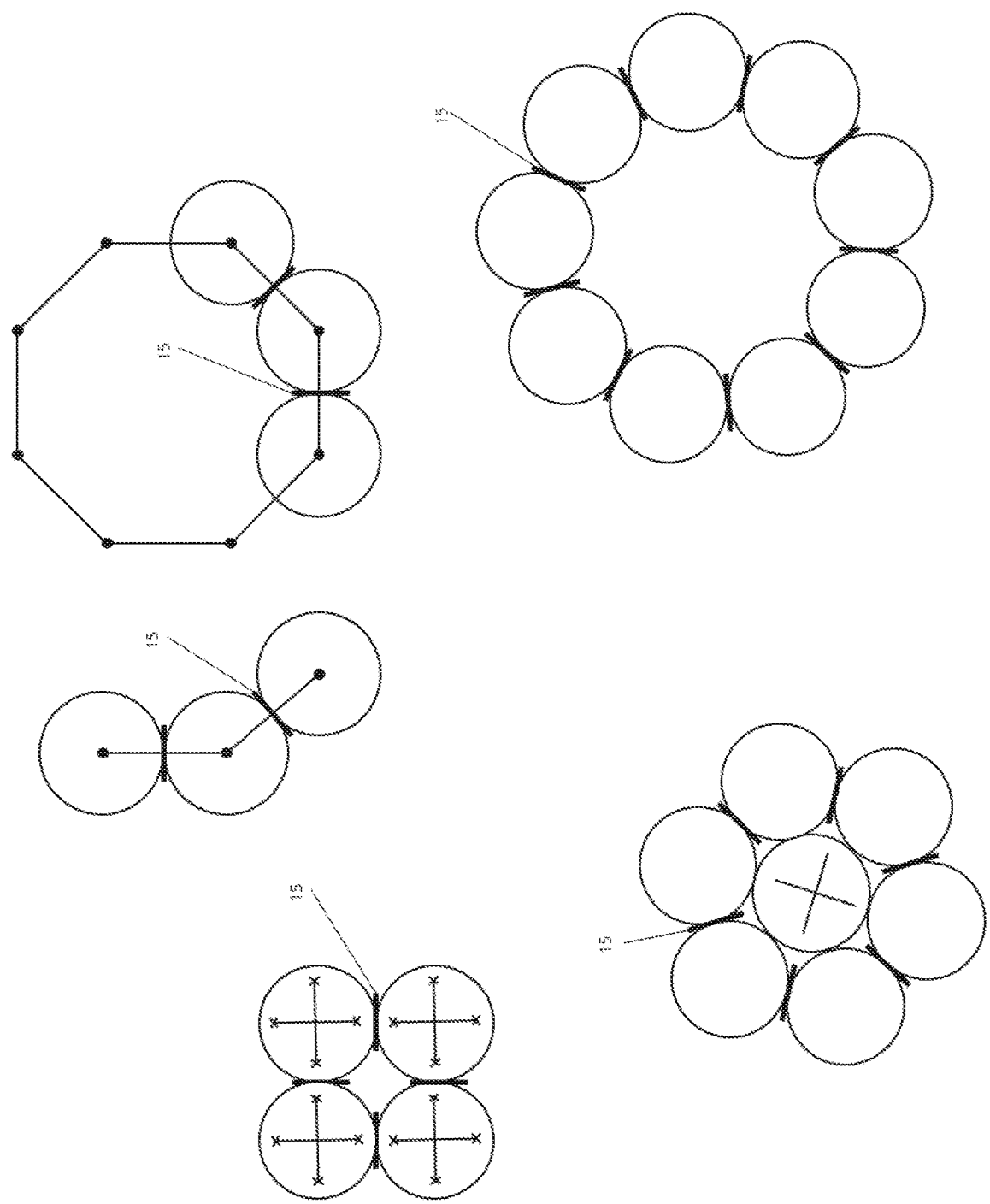
FIG. 42 is a diagram which illustrates various embodiments for performing a distributive propulsion between a plurality of devices.

Each device is provided with at least one securing member, not shown in FIGS. 39, 40 and 41, located on its outside shell. Each securing member is used for securing the outside shell with a corresponding mating member located on another device. The skilled addressee will appreciate that various shapes may be obtained as shown for instance in FIG. 42.

Seventh Embodiment of a Device for Sharing a Payload Between Two Vehicles

It will be appreciated that the device disclosed above may also be used with flying cars.

Figure 26:
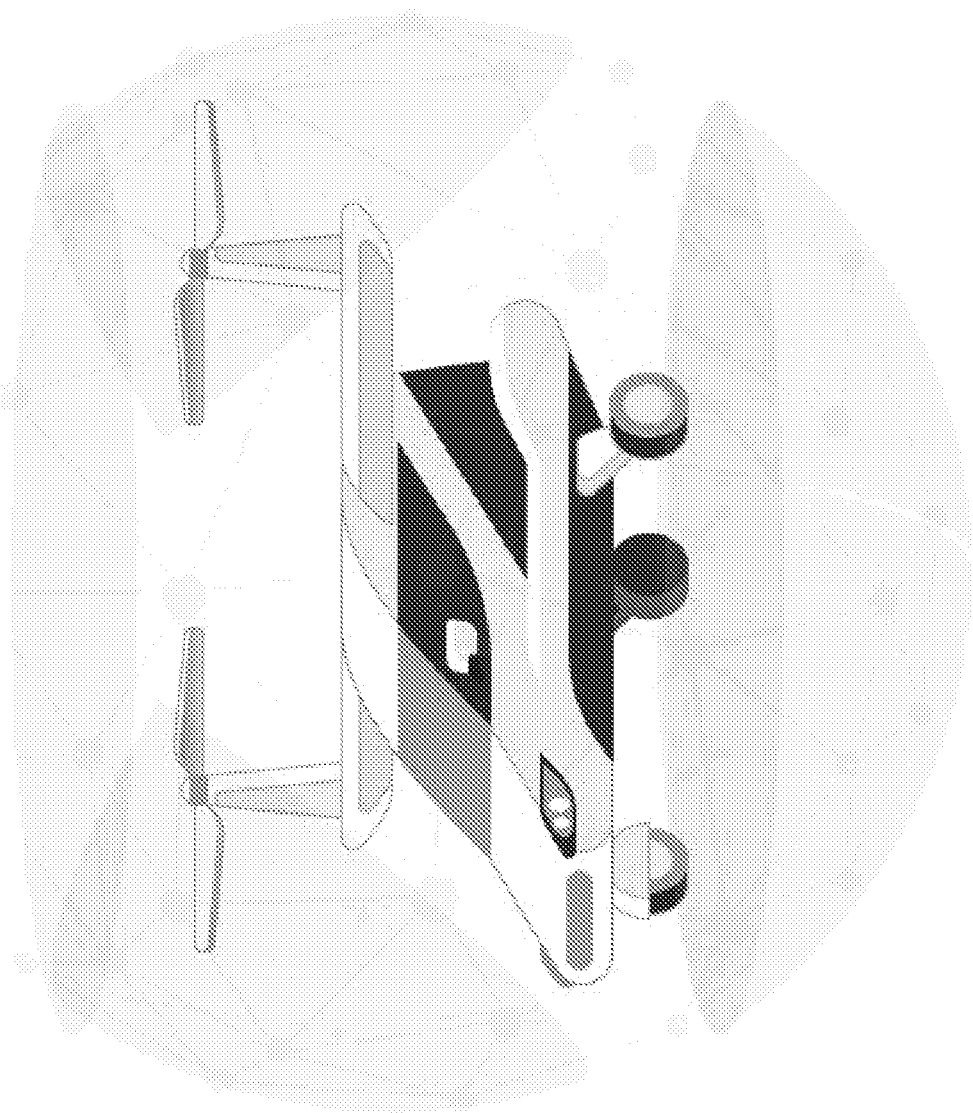
FIG. 26 is a diagram which shows an embodiment of a flying car which may be integrated in an embodiment of the device.

For instance FIG. 26 shows an embodiment of a flying car which may be integrated into an embodiment of the device.

Figures 27, 28:
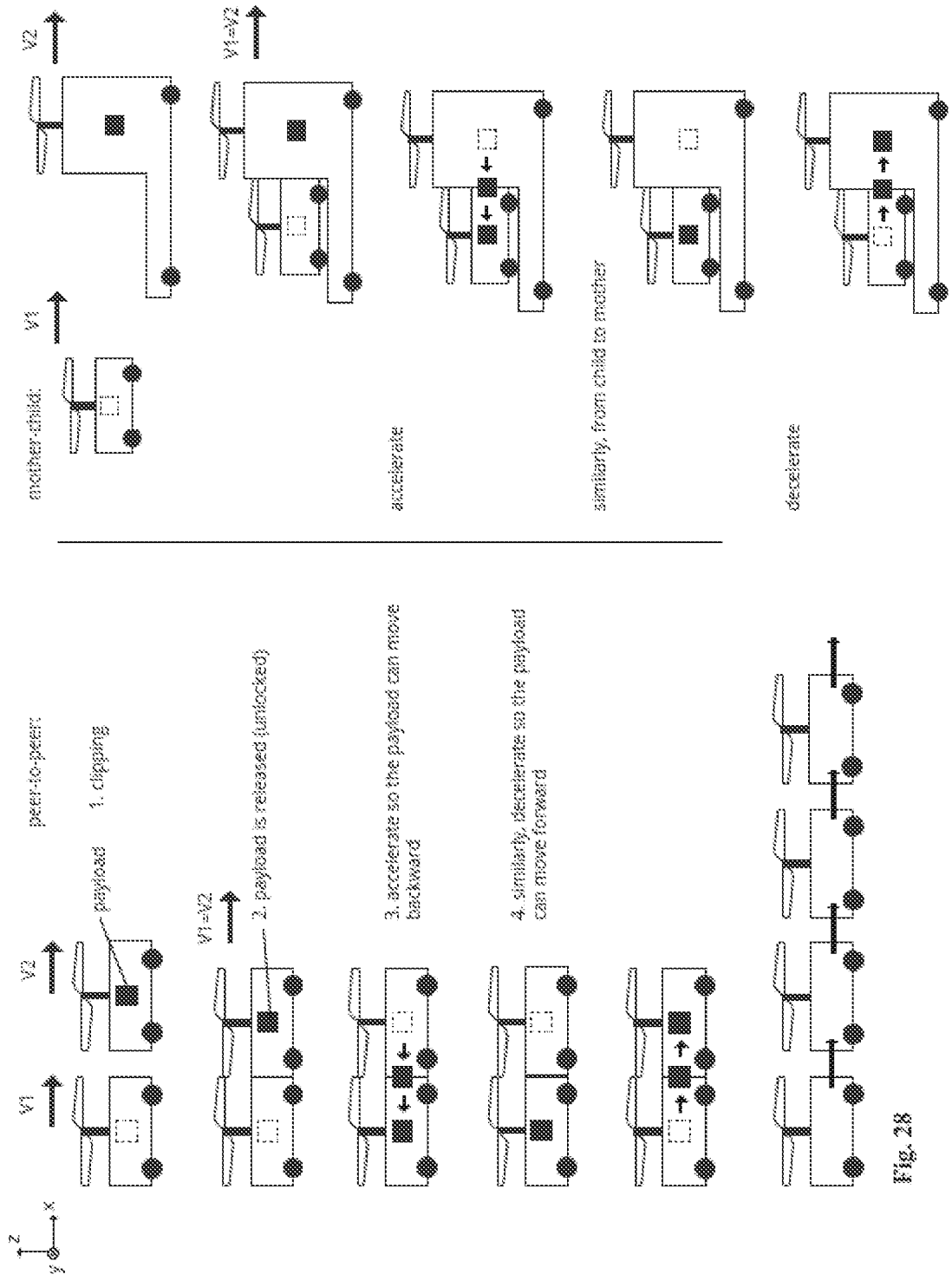
FIG. 27 is a diagram which illustrates how a payload may be swapped between two vehicles which are flying cars and are integrated in the device.
FIG. 28 is a diagram which illustrates how flying cars may be connected together using the device.

Now referring to FIG. 27, it will be appreciated that a payload may be swapped between two vehicles which are flying cars and are each integrated in the device.

Also it will be appreciated, as shown in FIG. 28, that flying cars may be connected together using the device and the methods disclosed above.

A sample connection 15 of the flying cars is also illustrated at FIG. 29.

Many types of connection 15 between flying cars may be achieved thanks to the device. For instance, a train-like connection 15 of the flying cars is illustrated in FIG. 30. In FIG. 31 a circle connection 15 of the flying cars is illustrated. This may be of great advantage for achieving distributive propulsion.

It will be further appreciated by the skilled addressee that when individual systems are connected as distributive propulsion such as the train-like series or circle connection 15 disclosed in respectively FIGS. 29 and 30, a peer-to-peer payload swapping may be executed first between two neighbouring peers and consecutively to a next neighbour until the last system. This means that, using the method disclosed herein, it is possible to do a distant payload-swapping, or transfer, because a payload may be transferred from a system on one end of the connection 15 to the other end through peer-to-peer payload-swapping.

It will be appreciated that FIGS. 26-31 are provided to illustrate various concepts. The skilled addressee will appreciate that various alternative embodiments may be provided.

As illustrated above, it will be appreciated that one or more embodiments of the device disclosed herein are of great advantage for various reasons.

A first advantage of one or more embodiments of the device disclosed is that it enables two vehicles to share a payload.

Another advantage of one or more embodiments of the device disclosed is that it may enable achievement of distributive propulsion by associating together a plurality of vehicles.

Clause 1. A device for enabling a vehicle to share a payload with another vehicle, the device comprising:

an interior shell receiving therein a vehicle, the interior shell further comprising at least one payload receiving unit, each payload receiving unit suitable for receiving a corresponding payload;

an outside shell surrounding the interior shell, the outside shell comprising at least one opening sized and shaped for transferring a given payload between inside and outside of the outside shell;

a securing member located on the outside shell and for securing the outside shell with a corresponding mating member located on another device with which a transfer of a payload has to be performed;

a controllable biasing member connected to the interior shell and to the outside shell, the biasing member being operable between a biasing state wherein the outside shell is rigidly connected with the interior shell and a free state wherein the interior shell is moveable with respect to the outside shell along at least one given axis; and wherein a transfer of the payload is achieved by at least securing the outside shell of the device using the securing member with another device, operating the biasing member in the free state, moving the interior shell with respect to the outside shell using the vehicle and transferring the payload accordingly.

Clause 2. The device as claimed in clause 1, wherein the outside shell surrounds partially the interior shell.

Clause 3. The device as claimed in clause 1, wherein the outside shell fully surrounds the interior shell.

Clause 4. The device as claimed in clause 1, wherein the outside shell has a spherical shape.

Clause 5. The device as claimed in clause 1, wherein the interior shell has a spherical shape.

Clause 6. The device as claimed in any one of clauses 1 to 5, wherein the vehicle is selected from a group consisting of a flying vehicle, a ground vehicle and an underwater vehicle.

Clause 7. The device as claimed in clause 6, wherein the flying vehicle is one of a drone, a flying car and a car drone.

Clause 8. The device as claimed in clause 6, wherein the ground vehicle operates on one of one of sand and snow.

Clause 9. The device as claimed in clause 6, wherein the ground vehicle comprises at least one moving mechanism, each of the at least one moving mechanism abutting an interior of the interior shell and causing the device to roll accordingly.

Clause 10. The device as claimed in any one of clauses 1 to 9, wherein the at least one opening of the outside shell is sized and shaped for enabling another vehicle to enter inside the outside shell, further wherein the payload transfer is performed while the other vehicle is located inside the outside shell.

Clause 11. The device as claimed in any one of clauses 1 to 9, wherein the outside shell comprises means for flexibly attaching the outside shell of another vehicle Clause 12. The device as claimed in clause 11, wherein a payload transfer is achieved by performing at least one of a rotation, an acceleration and a deceleration following attachment of two vehicles.

Clause 13. The device as claimed in any one of clauses 1 to 12, wherein the payload comprises a battery suitable for providing electrical energy to the vehicle.

Clause 14. The device as claimed in clause 1, wherein the outside shell further comprises an opening suitable for receiving another device of a smaller size.

Clause 15. A device for a vehicle, the device comprising:

an interior shell receiving therein a vehicle;

an outside shell surrounding the interior shell;

at least one securing member located on the outside shell, each of the at least one securing member for securing the outside shell with a corresponding mating member located on another device;

a controllable biasing member connected to the interior shell and to the outside shell, the biasing member being operable between a biasing state wherein the outside shell is rigidly connected with the interior shell and a free state wherein the interior shell is moveable with respect to the outside shell along at least one given axis; and wherein a connection may be performed between at least two vehicles using the at least one securing member by operating the biasing member in the free state and moving the interior shell with respect to the outside shell using the vehicle.

Although the above description relates to a specific preferred embodiment as presently contemplated by the inventor, it will be understood that the invention in its broad aspect includes functional equivalents of the elements described herein.

The invention claimed is:

1. A device for enabling a vehicle to share a payload with another vehicle, the device comprising:
   an interior shell receiving therein a vehicle, the interior shell further comprising at least one payload receiving unit, each payload receiving unit suitable for receiving a corresponding payload;
   an outside shell surrounding at least a portion of the interior shell, the outside shell comprising at least one opening sized and shaped for transferring a given payload between inside and outside of the outside shell;
   a securing member located on the outside shell and for securing the outside shell with a corresponding mating member located on another device with which a transfer of a payload has to be performed;
   a controllable biasing member connected to the interior shell and to the outside shell, the biasing member being operable between a biasing state wherein the outside shell is rigidly connected with the interior shell and a free state wherein the interior shell is moveable with respect to the outside shell along at least one given axis; and
   wherein a transfer of the payload is achieved by at least securing the outside shell of the device using the securing member with another device, operating the biasing member in the free state, moving the interior shell with respect to the outside shell using the vehicle and transferring the payload accordingly.

2. The device as claimed in claim 1, wherein the outside shell fully surrounds the interior shell.

3. The device as claimed in claim 1, wherein the outside shell has a spherical shape.

4. The device as claimed in claim 1, wherein the interior shell has a spherical shape.

5. The device as claimed in claim 1, wherein the vehicle is selected from a group consisting of a flying vehicle, a ground vehicle and an underwater vehicle.

6. The device as claimed in claim 5, wherein the flying vehicle is one of a drone, a flying car and a flying car.

7. The device as claimed in claim 5, wherein the ground vehicle operates on one of sand and snow.

8. The device as claimed in claim 5, wherein the ground vehicle comprises at least one moving mechanism, each of the at least one moving mechanism abutting an interior of the interior shell and causing the device to roll accordingly.

9. The device as claimed in claim 1, wherein the at least one opening of the outside shell is sized and shaped for enabling another vehicle to enter inside the outside shell, further wherein the payload transfer is performed while the other vehicle is located inside the outside shell.

10. The device as claimed in claim 1, wherein the outside shell comprises means for flexibly attaching an outside shell of another vehicle.

11. The device as claimed in claim 10, wherein a payload transfer is achieved by performing at least one of a rotation, an acceleration and a deceleration following attachment of two vehicles.

12. The device as claimed in claim 1, wherein the payload comprises a battery suitable for providing electrical energy to the vehicle.

13. The device as claimed in claim 1, wherein the outside shell further comprises an opening suitable for receiving another device of a smaller size.

14. A device for a vehicle, the device comprising:

an interior shell receiving therein a vehicle;

an outside shell surrounding the interior shell;

at least one securing member located on the outside shell, each of the at least one securing member for securing the outside shell with a corresponding mating member located on another device;

a controllable biasing member connected to the interior shell and to the outside shell, the biasing member being operable between a biasing state wherein the outside shell is rigidly connected with the interior shell and a free state wherein the interior shell is moveable with respect to the outside shell along at least one given axis; and wherein a connection may be performed between at least two vehicles using the at least one securing member by operating the biasing member in the free state and moving the interior shell with respect to the outside shell using the vehicle.

* * * * *